June 17, 1958 C. A. SIMMONS, SR 2,838,969

ASSEMBLING AND RIVETING APPARATUS

Filed Feb. 4, 1955 16 Sheets-Sheet 1

INVENTOR
Charles A. Simmons, Jr.
BY
Davis, Hoxie & Faithfull
ATTORNEYS

ASSEMBLING AND RIVETING APPARATUS

Filed Feb. 4, 1955 16 Sheets-Sheet 2

INVENTOR
Charles A. Simmons, Sr.
BY
Davis, Hoxie & Faithfull
ATTORNEYS

June 17, 1958 C. A. SIMMONS, SR 2,838,969

ASSEMBLING AND RIVETING APPARATUS

Filed Feb. 4, 1955 16 Sheets-Sheet 3

INVENTOR
Charles A. Simmons, Sr.
BY
Davis, Hoxie & Faithfull
ATTORNEYS

INVENTOR
Charles A. Simmons, Sr.
BY
Davis, Hoxie & Faithfull
ATTORNEYS

June 17, 1958 C. A. SIMMONS, SR 2,838,969

ASSEMBLING AND RIVETING APPARATUS

Filed Feb. 4, 1955 16 Sheets-Sheet 5

INVENTOR
Charles A. Simmons, Sr.
BY
Davis, Hoxie & Faithfull
ATTORNEYS

June 17, 1958 C. A. SIMMONS, SR 2,838,969

ASSEMBLING AND RIVETING APPARATUS

Filed Feb. 4, 1955 16 Sheets-Sheet 6

INVENTOR
Charles A. Simmons, Sr.
BY
Davis, Hoxie & Faithfull
ATTORNEYS

ASSEMBLING AND RIVETING APPARATUS

Filed Feb. 4, 1955

INVENTOR
Charles A. Simmons, Sr.
BY
Davis, Hoxie & Faithfull
ATTORNEYS

June 17, 1958 C. A. SIMMONS, SR 2,838,969

ASSEMBLING AND RIVETING APPARATUS

Filed Feb. 4, 1955 16 Sheets-Sheet 8

INVENTOR
Charles A. Simmons, Sr.
BY
Davis, Hoxie & Faithfull
ATTORNEY

June 17, 1958 C. A. SIMMONS, SR 2,838,969

ASSEMBLING AND RIVETING APPARATUS

Filed Feb. 4, 1955 16 Sheets-Sheet 9

INVENTOR
Charles A. Simmons, Sr.
BY
Davis, Hoxie & Faithfull
ATTORNEYS

June 17, 1958 C. A. SIMMONS, SR 2,838,969
ASSEMBLING AND RIVETING APPARATUS
Filed Feb. 4, 1955 16 Sheets-Sheet 10
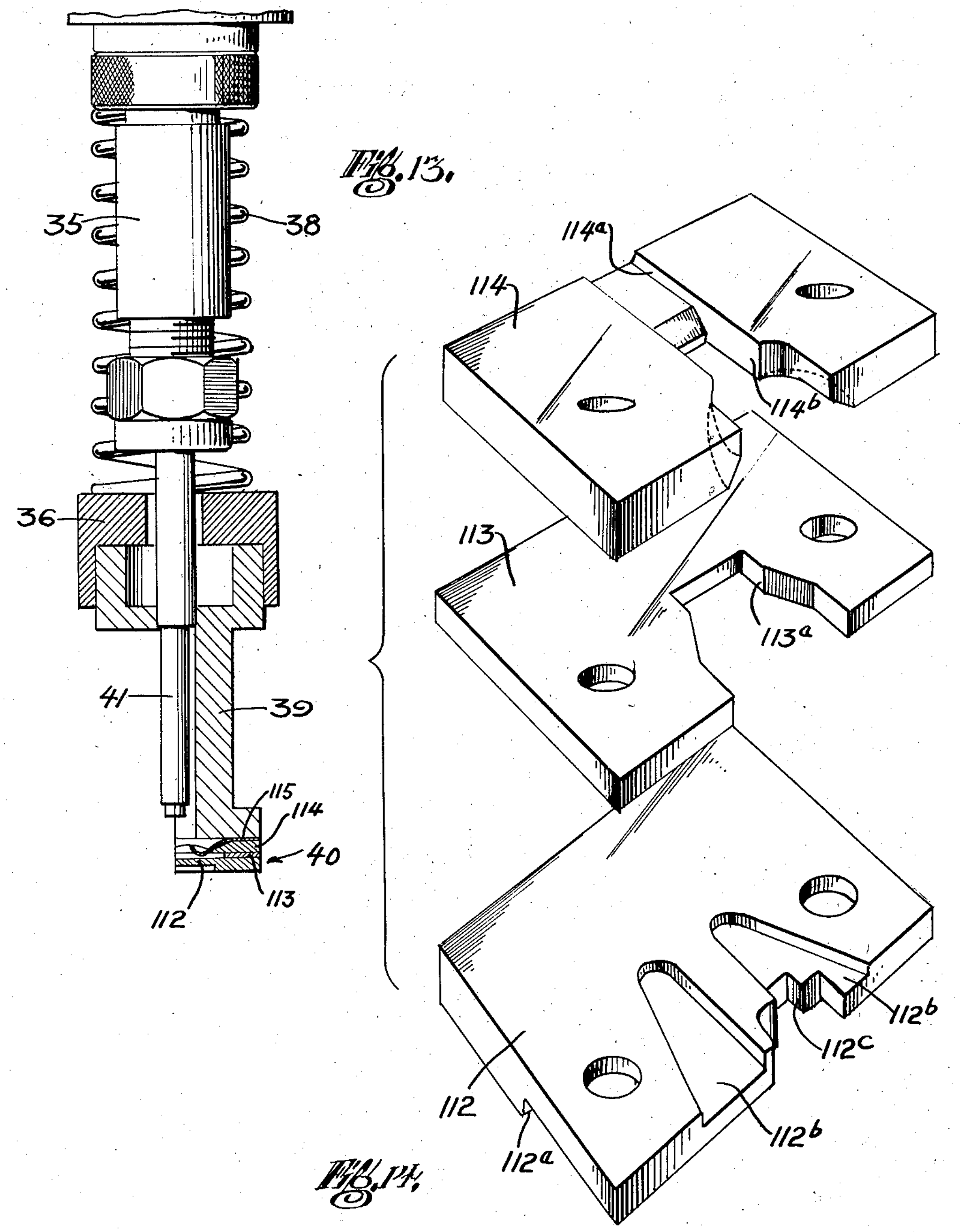
Fig. 13, Fig. 14,
INVENTOR
Charles A. Simmons, Sr.
BY
Davis, Hoxie & Faithfull
ATTORNEYS June 17, 1958 C. A. SIMMONS, SR 2,838,969

ASSEMBLING AND RIVETING APPARATUS

Filed Feb. 4, 1955 16 Sheets-Sheet 11

INVENTOR
Charles A. Simmons, Sr.
BY
Davis, Hoxie & Faithfull
ATTORNEYS

June 17, 1958 C. A. SIMMONS, SR 2,838,969

ASSEMBLING AND RIVETING APPARATUS

Filed Feb. 4, 1955 16 Sheets-Sheet 12

INVENTOR
Charles A. Simmons, Jr.
BY
Davis, Hoxie & Faithfull
ATTORNEYS

June 17, 1958 C. A. SIMMONS, SR 2,838,969

ASSEMBLING AND RIVETING APPARATUS

Filed Feb. 4, 1955 16 Sheets-Sheet 13

INVENTOR
Charles A. Simmons, Sr.
BY
Davis, Hoxie & Faithfull
ATTORNEYS

INVENTOR
Charles A. Simmons, Sr.
BY
Davis, Hoxie & Faithfull
ATTORNEYS

INVENTOR
Charles A. Simmons, Sr.
BY
Davis, Hoxie & Faithfull
ATTORNEYS

INVENTOR
Charles A. Simmons, Sr.
BY
Davis, Hoxie & Faithfull
ATTORNEYS

United States Patent Office 2,838,969

Patented June 17, 1958

2,838,969

ASSEMBLING AND RIVETING APPARATUS

Charles A. Simmons, Sr., Albany, N. Y., assignor to Simmons Fastener Corporation, Menands, N. Y., a corporation of New York Application February 4, 1955, Serial No. 486,123

15 Claims. (Cl. 78—49)

This invention relates to the manufacture of sliders for separable fasteners or zippers. It has particular reference to an improved apparatus for assembling the components of such sliders.

The function of the slider of a zipper is to join and separate the interconnecting elements or scoops of the two stringers which form the fastener chain. For this purpose, the body of the slider has two opposed guide plates between which is a space where the interconnecting elements of the respective stringers are brought together in interlocking relation by movement of the slider in one direction and are separated by movement of the slider in the opposite direction. In the more advanced forms of zippers, the slider is arranged so that it can be released to free the slider if the fastener jams, as may occur. Then the fabric of the tape stringers becomes lodged between the slider and the interconnecting elements. For this purpose, the two guide plates forming the main body of the slider are interconnected by a resilient yoke (which may be integral with the plates) so that the two plates form relatively movable jaws; and by manual operation of a pivotal member on the slide, the two plates or jaws are adjusted between (1) a closed or operable position wherein their free ends are spaced relatively close together for interleaving of the interconnecting elements through movement of the slider, and (2) a released position wherein the spacing between their free ends is substantially greater to permit freeing of the slider if it should jam.

The pivotal member for adjusting the two guide plates is mounted adjacent one of the plates by means of a bail extending through an opening in the pivotal member. The bail has a lateral projection extending through aligned openings in the opposed guide plates so as to bridge the space between them, the end of the projection or bridging part being expanded to secure it to the guide plate remote from the bail. The pivotal member may be a cam on the usual pull-tab mounted on the bail for moving the slider, or it may be a separate cam carried by the bail, in which the bail extends through openings in both the cam and the pull-tab, as disclosed in my copending application Serial No. 335,696, filed February 9, 1953.

To assemble the components of this releasable type of slider, the bail is first inserted through the opening in the pull-tab and, if the adjusting cam is separate from this tab, through the opening in the cam as well. Then the bridging part of the bail is inserted through the aligned openings in the guide plates and its end expanded to hold it in position. The entire assembly work must be performed with precision, as the components themselves are small and the openings in which they are inserted do not allow any substantial misalignment of the components during these inserting operations. Moreover, the assembly operations are further complicated by the fact that when inserting the bridging part of the bail through the plates, the pull-tab and cam (if separate from the tab) must be aligned with corresponding notches in the bail, as these notches must receive the tab and cam in the final position of the bail and its bridging part. It will be apparent, therefore, that the problem of assembling the various components rapidly and inexpensively, to meet the requirements of mass production, is a difficult one.

The present invention has for its principal object the provision of a method and apparatus which solve this problem.

For illustrative purposes, the invention will be described with reference to the assembling of releasable sliders of the type having a separate cam forming the pivotal adjustment member, since they present a still more difficult assembly problem than sliders in which the cam forms part of the pull-tab.

According to the invention, the components of the slider are fed to an assembling zone where they arrive substantially simultaneously, to be followed by another set of components when the the assembled slider is discharged from this zone. In the assembling zone, the pull-tab and cam are yieldingly supported with their respective openings in alignment and with the same spacing as that between the corresponding notches in the bail. The latter, supported in alignment with these openings, is then thrust endwise and laced through the openings to a stop which locates these notches directly opposite the pull-tab and cam, respectively. At the time this lacing operation has been completed, or substantially so, the slider body (the interconnected guide plates) is positioned with its opposed openings in alignment with the projection or bridging part of the bail in its stopped position. The bail and body are then forced together to insert the bail projection through the aligned openings in the body. In the last part of this movement, the pull-tab and cam are pressed against their yielding support into the notches in the bail by the adjacent guide plate. While the parts are thus pressed together, the end of the bail projection is spun over the other guide plate to secure the parts and complete the assembly.

In its preferred form, the new apparatus comprises a plunger supporting a mandrel or holder for the slider body and to which one of these slider bodies is fed during each complete operating cycle of the assembling apparatus. The plunger also carries a spinning tool rotatable relative to the plunger. The body holder is yieldingly mounted on the plunger adjacent the spinning tool, so that when the slider body supported by the holder has been pressed against the bail to force its bridging member through the body openings, by operation of the plunger, further movement of the latter causes the body holder to yield while the spinner engages the projecting end of the bridging member and spins it over the adjacent guide plate of the slider body to hold the slider parts together. Prior to this operation of the plunger, and preferably before insertion of the slider body into the plunger mandrel, the sub-assembly of the bail, pull-tab and cam is effected by lacing the bail through the openings in the tab and cam. The sub-assembly means for this purpose comprise a die having two parallel grooves into which a pull-tab and a cam are fed in opposite directions to stopped positions during each operating cycle of the apparatus. In their stopped positions, the tab and cam are held on a yielding support with their openings in alignment, the support being yieldable in the direction of advanced movement of the plunger. The die is also provided with a groove extending perpendicular to the grooves for receiving the tab and cam, the third groove serving to guide a bail which is fed into the groove during each separate cycle. By means of the bail groove in the die, the bail is guided through the aligned openings in the pull-tab and cam. The lacing movement of the bail may be effected by means of the device which feeds the bail to the die, or it may be effected by supplemental means for giving added force to the bail movement, such as a power-operated finger movable into engagement with the lateral projection or bridge member of the bail.

When the bail has been driven through the aligned openings in the pull-tab and cam, the bail movement is arrested by a stop which is so positioned that the two notches in the bail are in the respective openings of the pull-tab and cam. Also, in this stopped position of the bail the lateral projection or bridge member of the bail extends toward the plunger and has its free end directly in line with the opposed openings in the body member when held by the mandrel or holder of the plunger. Thus, when the plunger is advanced to insert the bail projection through the slider body, the face of this body adjacent the bail will engage the pull-tab and cam and displace them against their yielding support so as to force them into the corresponding notches in the bail. Since the bail is rigidly supported on the die, further movement of the plunger will cause the body holder or mandrel to yield relative to the plunger and force the spinner against the projecting end of the bridging member of the bail, thereby spinning this end over the adjacent guide plate of the slider body. Preferably, the die is provided with a clamping device for locking the bail in its stopped position during the advanced movement of the plunger, this clamping device being released upon completion of the spinning step. The plunger is then retracted so that the assembled slider is disengaged by the spinner and is withdrawn from the die by the plunger mandrel. The assembled slider is preferably discharged from the mandrel during the return movement of the plunger, as by means of an air blast which blows the slider into a discharge chute.

In the preferred construction, the stop which arrests the bail movement at completion of the lacing operation is an electrical contact which, when engaged by the bail, completes a circuit for operating the plunger and moving the bail clamp to its locking position. Thus, operation of the plunger is prevented unless and until the bail has been laced through the pull-tab and cam and is in the proper position relative to the latter members and the slider body in the plunger mandrel. The loading of the slider body in the mandrel (which may be effected by a power-operated slide), the lacing movement of the bail and the return movements of the plunger are effected under the control of suitable means for insuring the initiation of these steps at the proper times in each operating cycle of the apparatus.

For a better understanding of the invention, reference may be had to the accompanying drawings illustrating a preferred form of the new apparatus. In the drawings.

Figure 3:
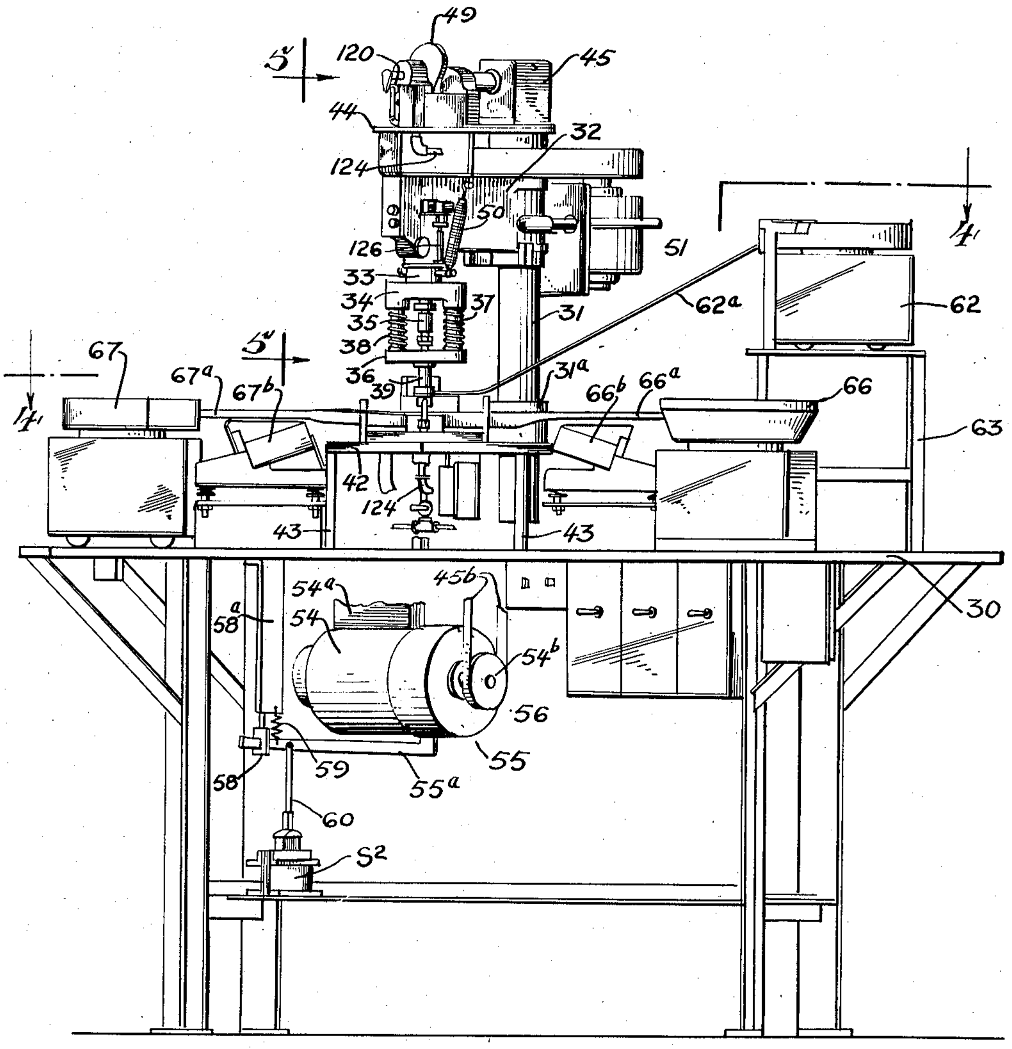
Fig. 3 is a rear view of the assembling apparatus.
Figure 4:
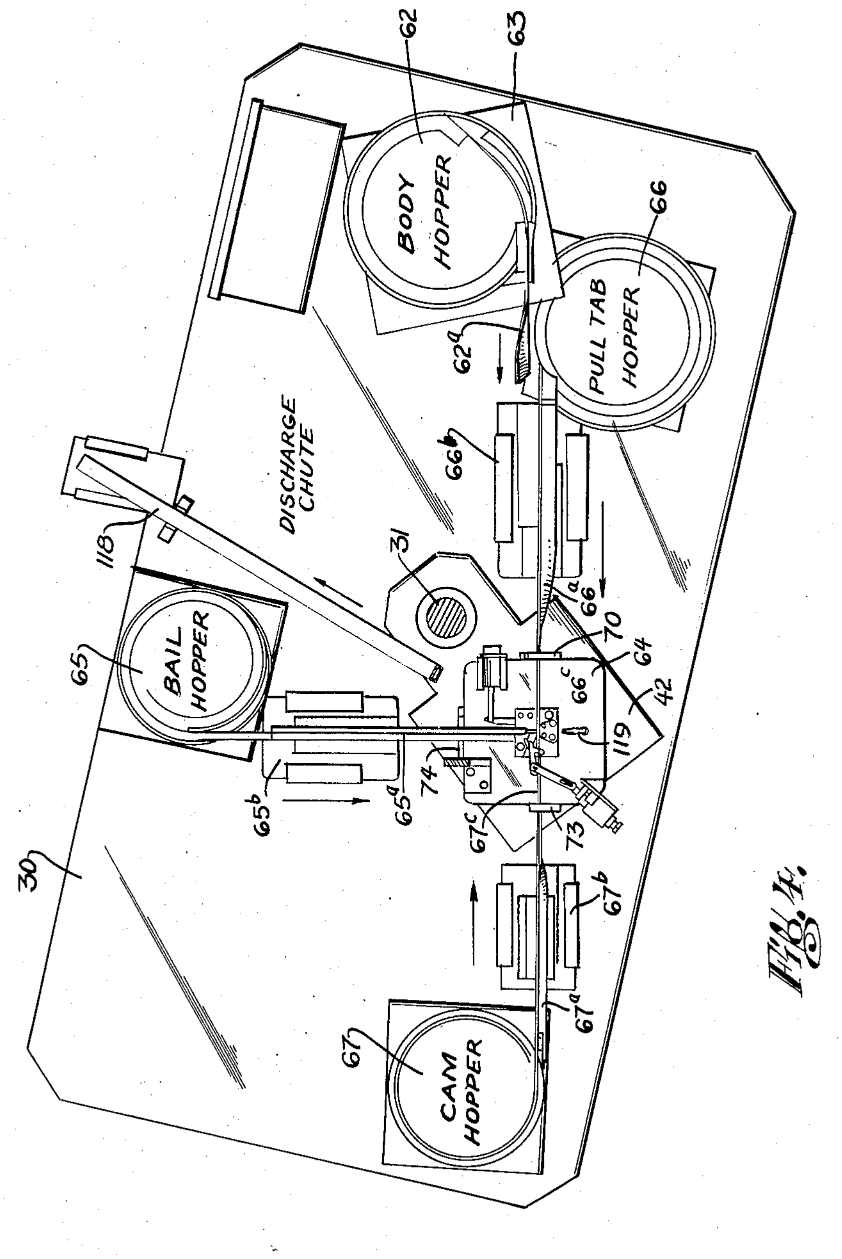
Figures 5A, 6:
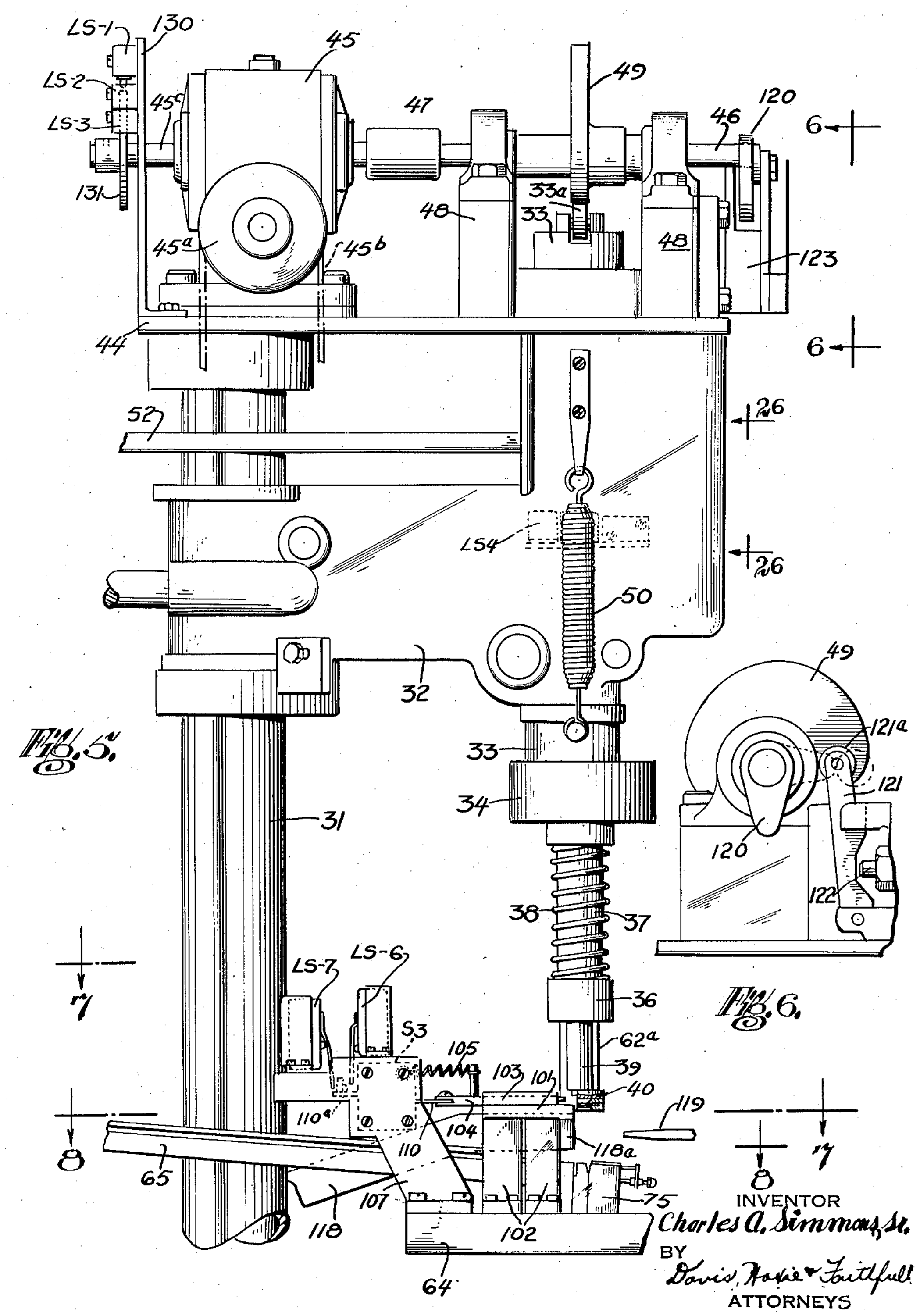
Figure 7:
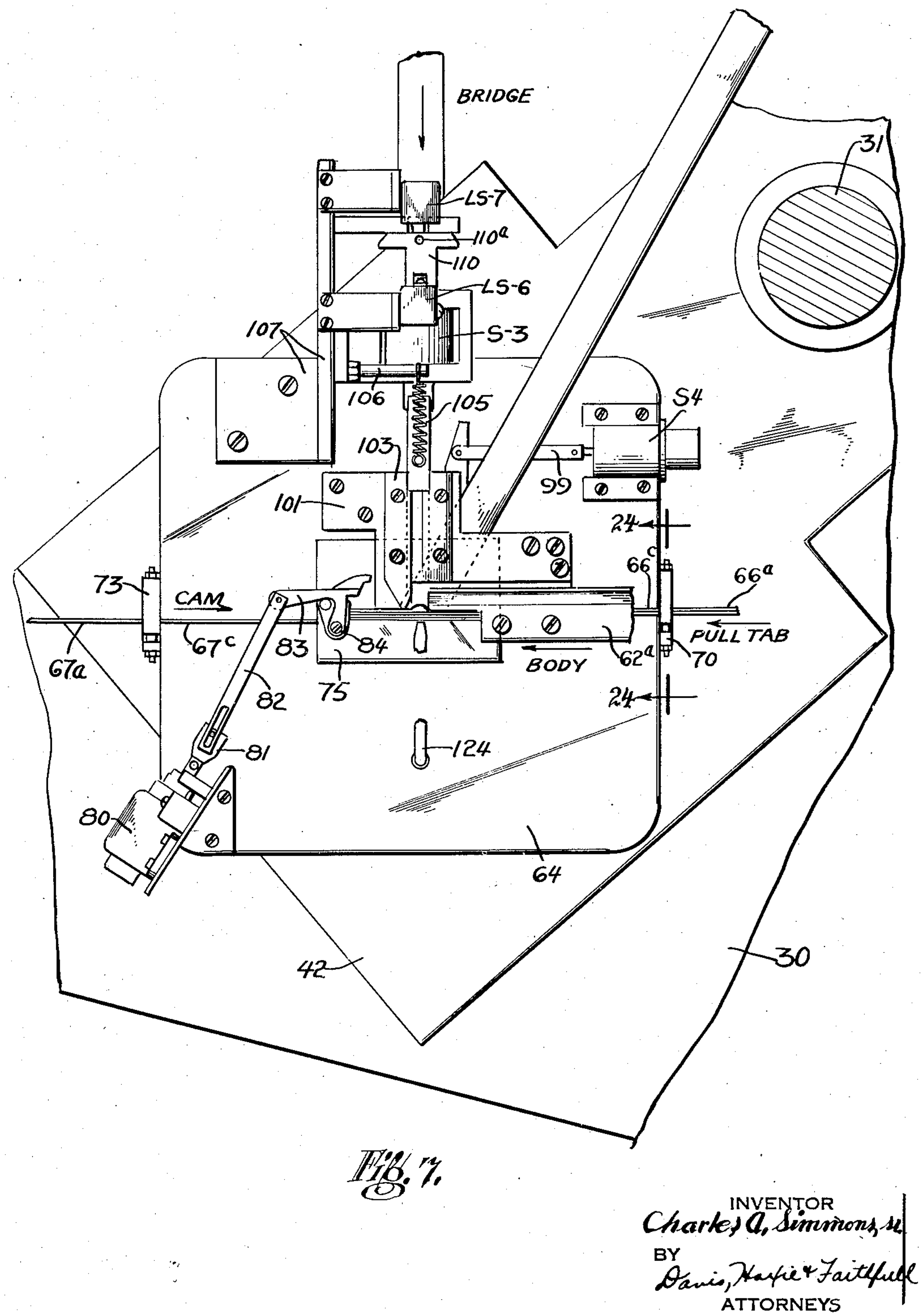
Figure 8:
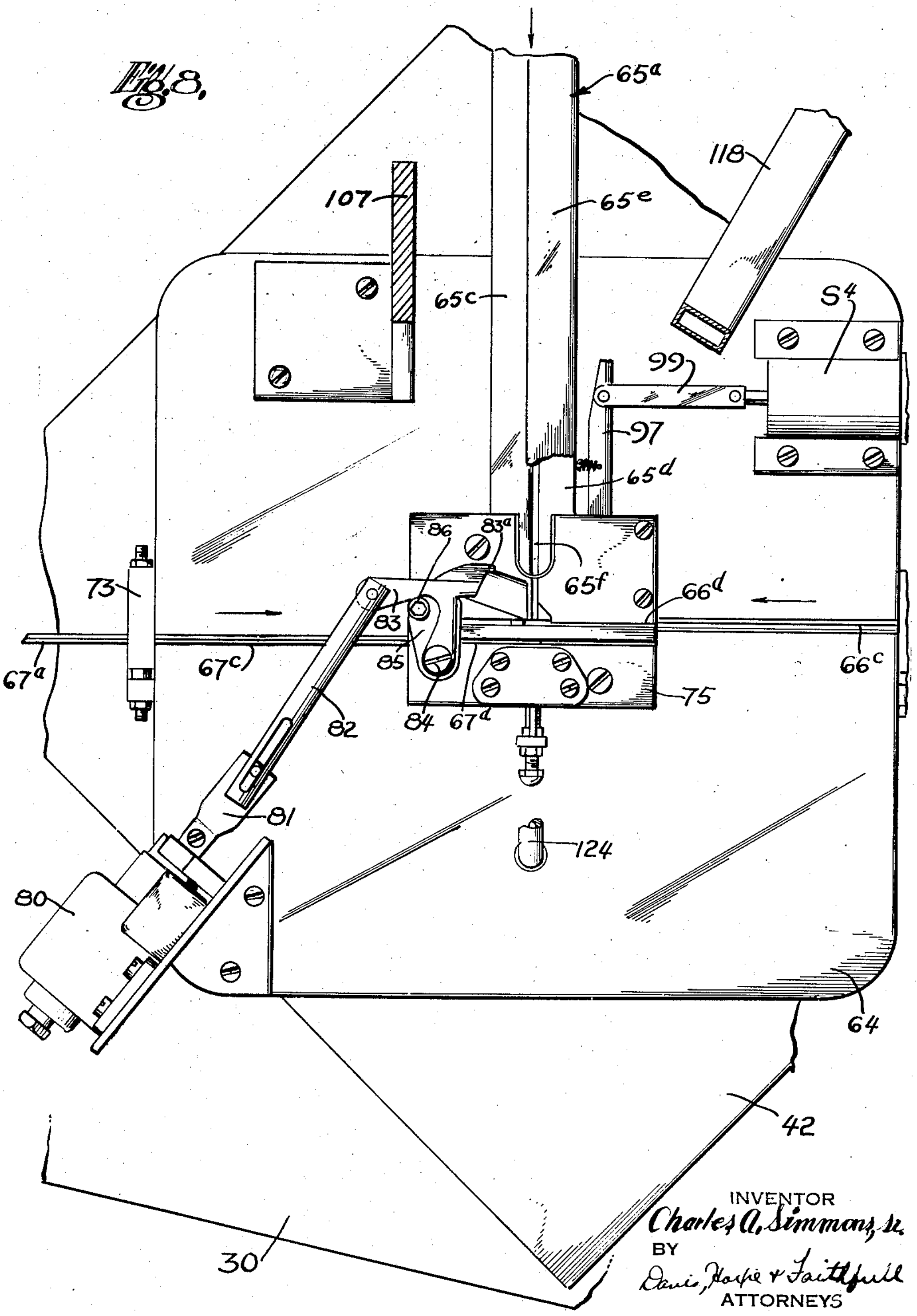
Figures 9, 10:
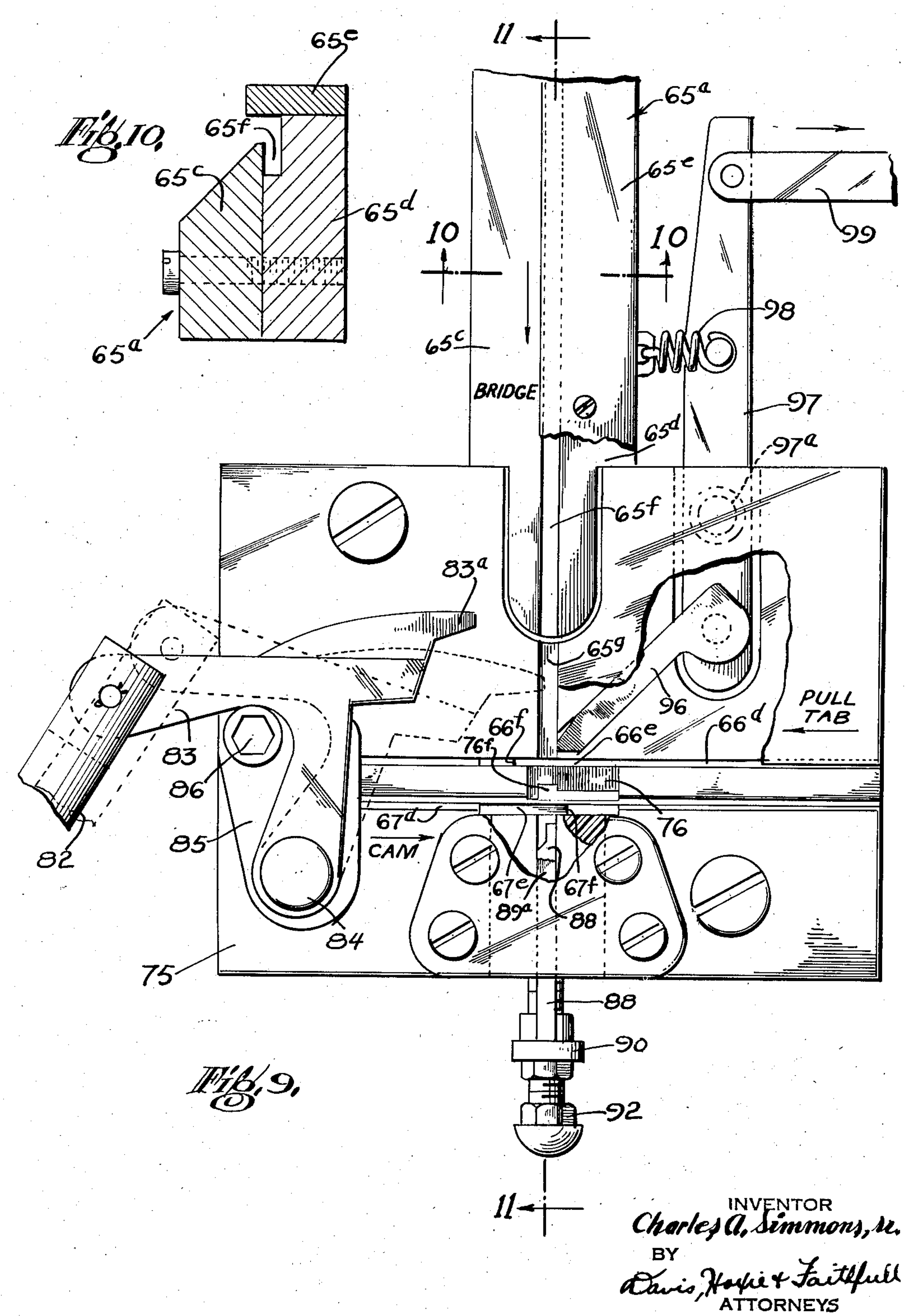
Figure 11:
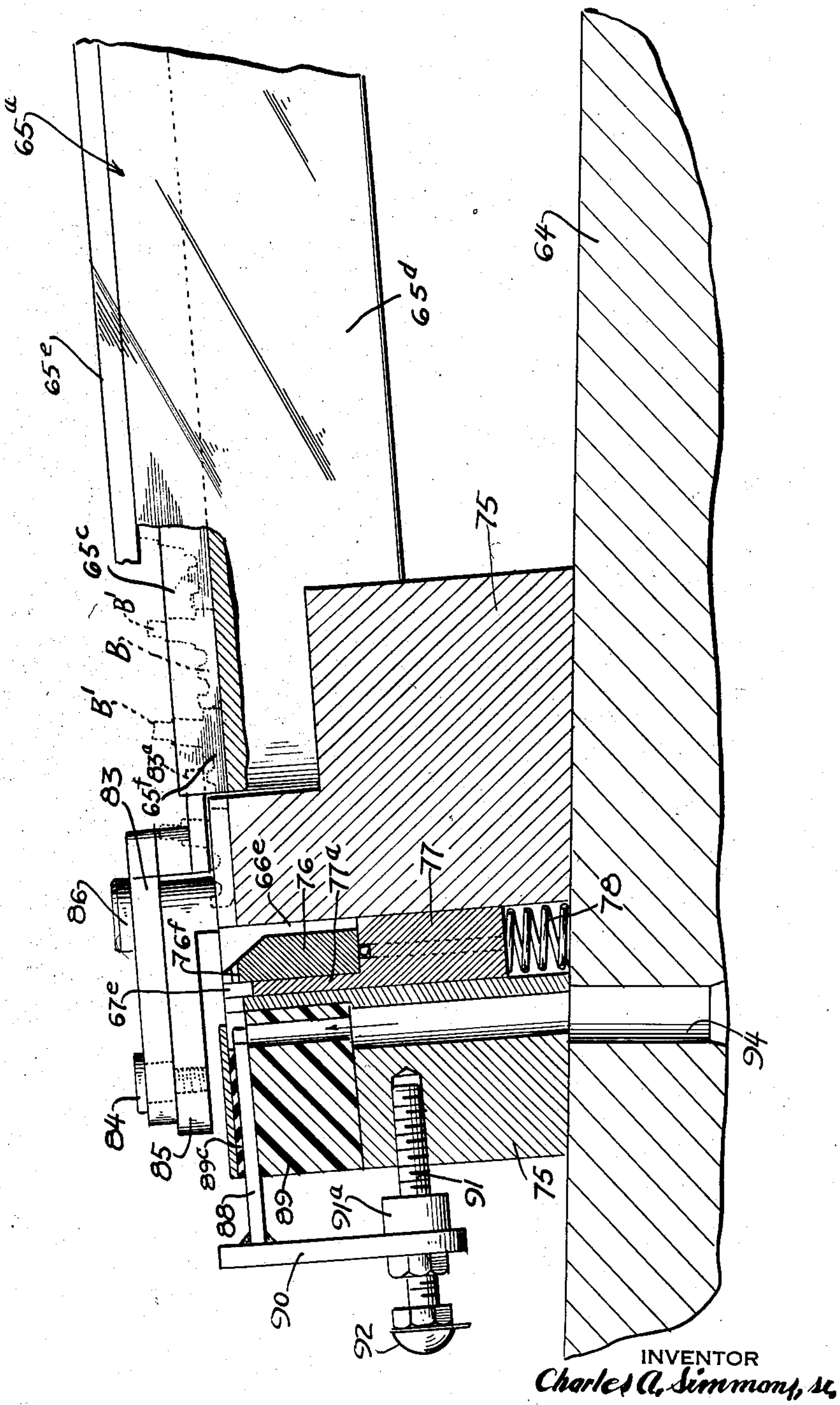
Figure 12:
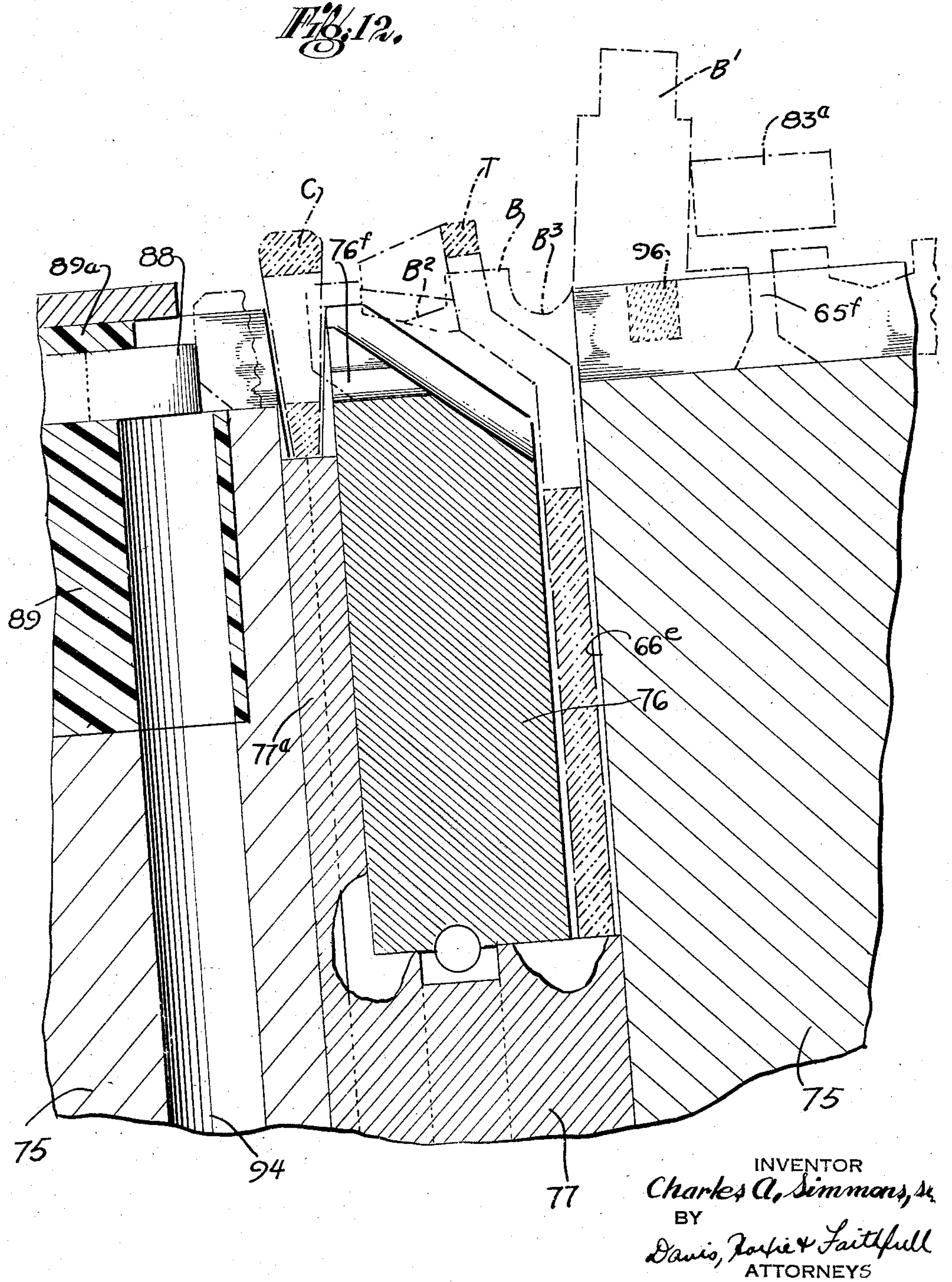
Figure 15:
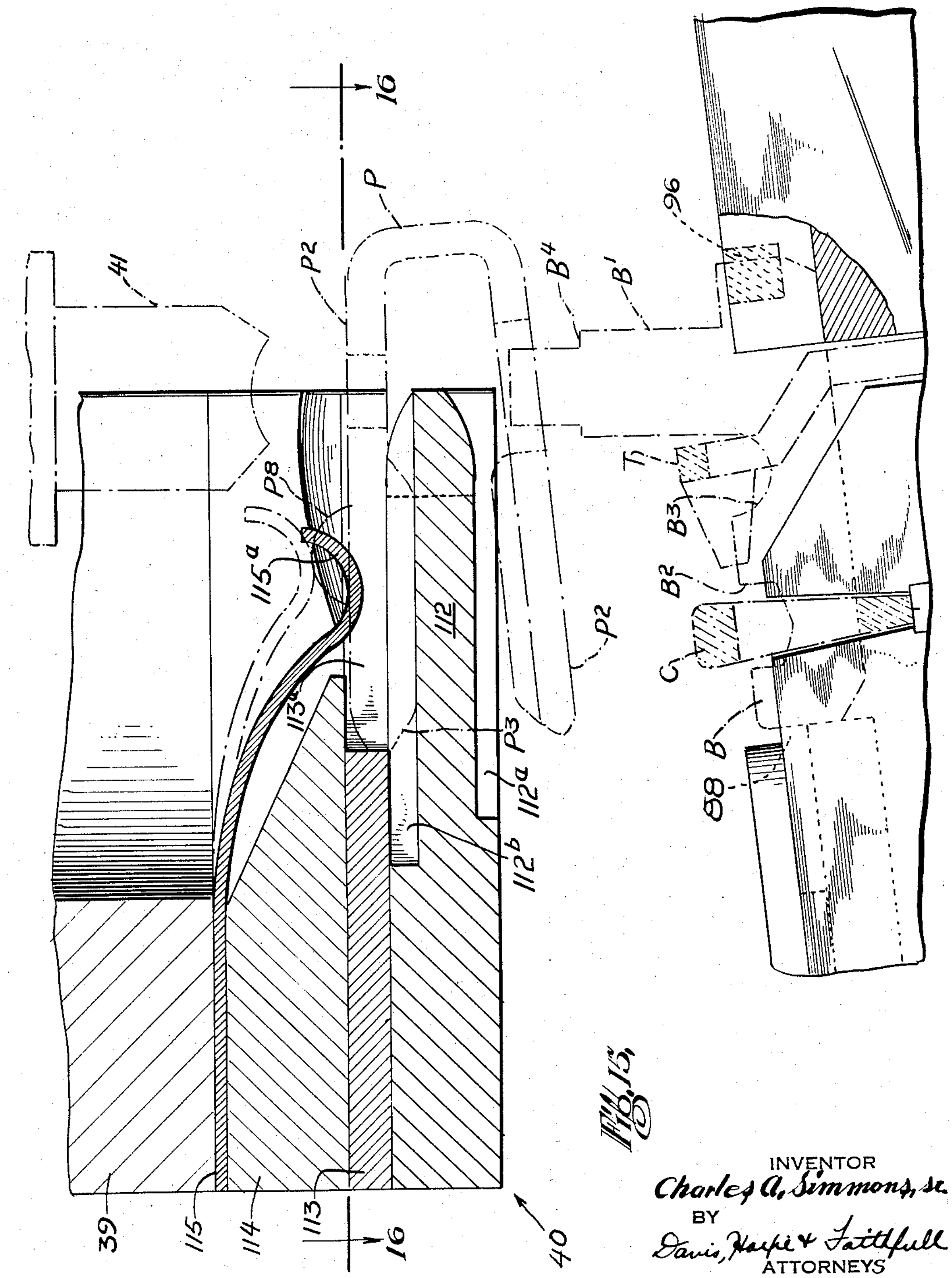

Figs. 4 and 5 are views on the lines 4—4 and 5—5 in Fig. 3;

Figs. 6, 7 and 8 are views on the lines 6—6, 7—7 and 8—8, respectively, in Fig. 5, Fig. 8 being on an enlarged scale as compared with Fig. 7;

Fig. 9 is an enlarged plan view of the die shown in Fig. 8;

Figs. 10 and 11 are sectional views on the lines 10—10 and 11—11, respectively, in Fig. 9;

Fig. 12 is an enlarged sectional view of part of the die, as shown in Fig. 11;

Fig. 13 is a side elevational view of the lower part of the plunger, the mandrel and its connection with the plunger being shown in vertical section;

Fig. 14 is an exploded perspective view of the mandrel carried by the plunger;

Fig. 15 is an enlarged vertical sectional view of the mandrel, showing in outline a slider body inserted in the mandrel and carried part of the way toward the sub-assembly on the die by advanced movement of the plunger.

Figure 16:
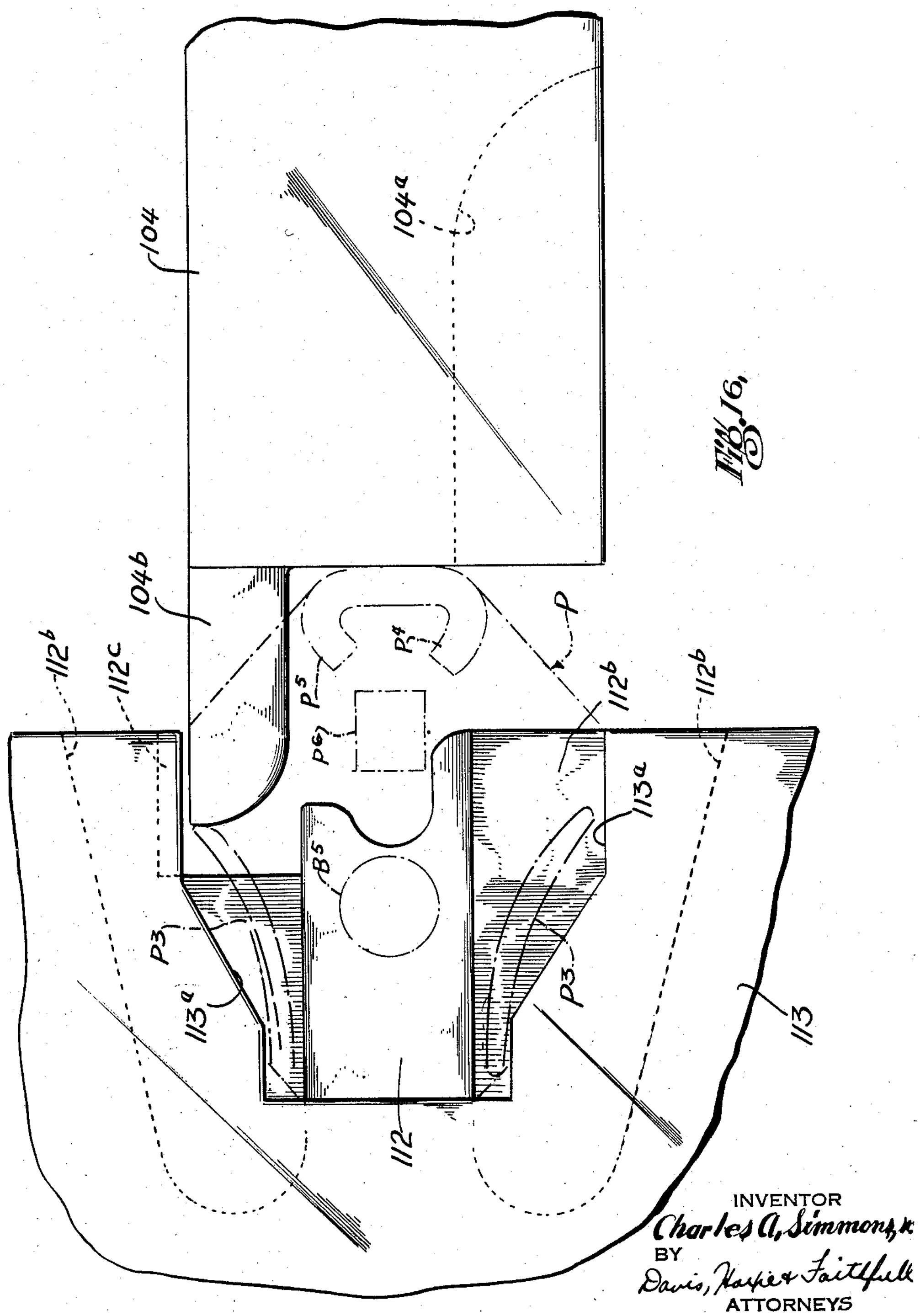
Figure 17:
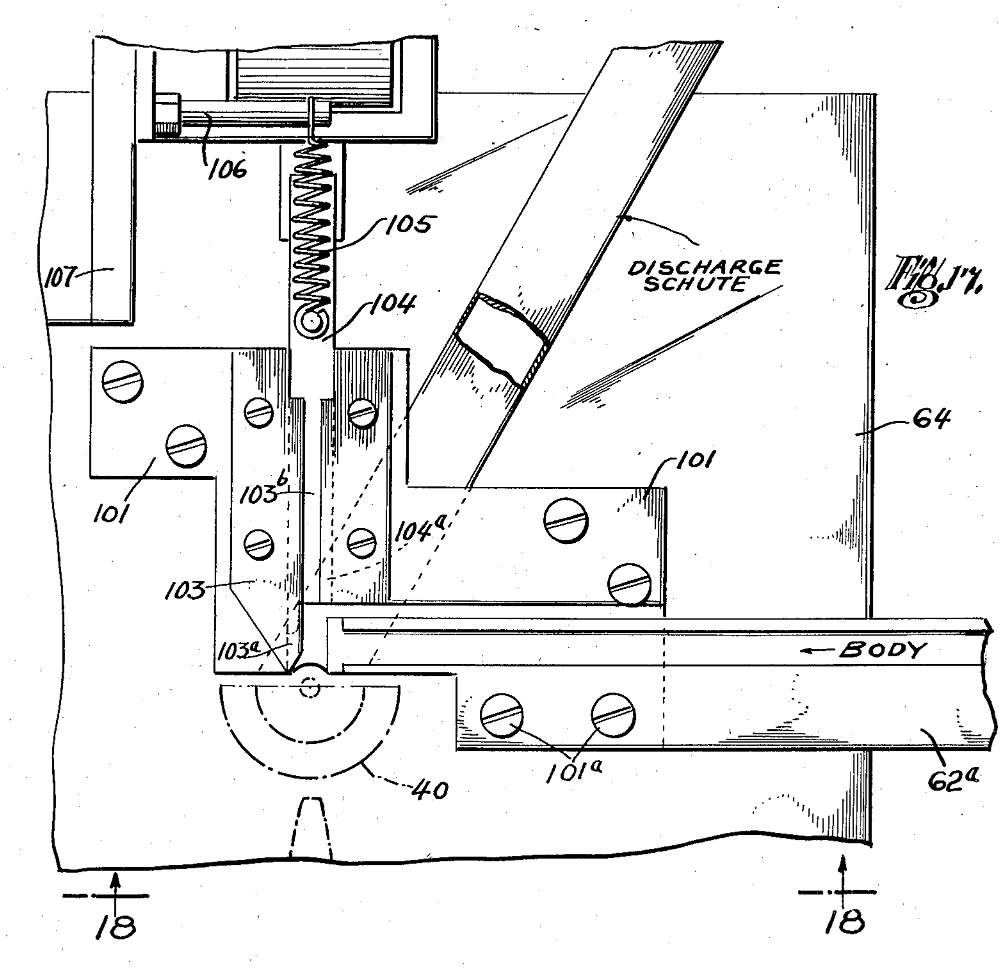
Figure 18:
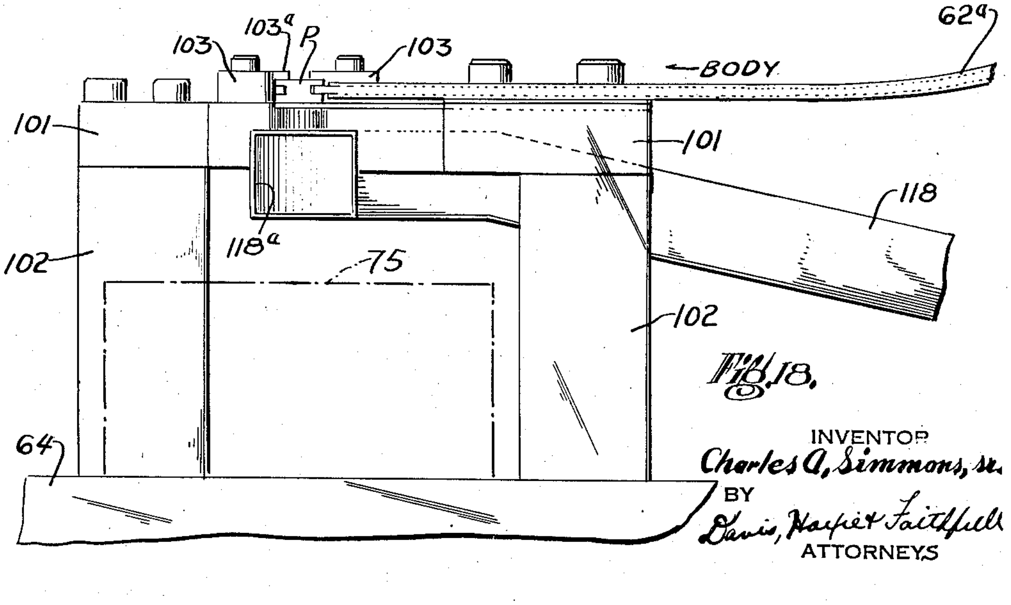
Figures 19, 20, 21, 22, 23:
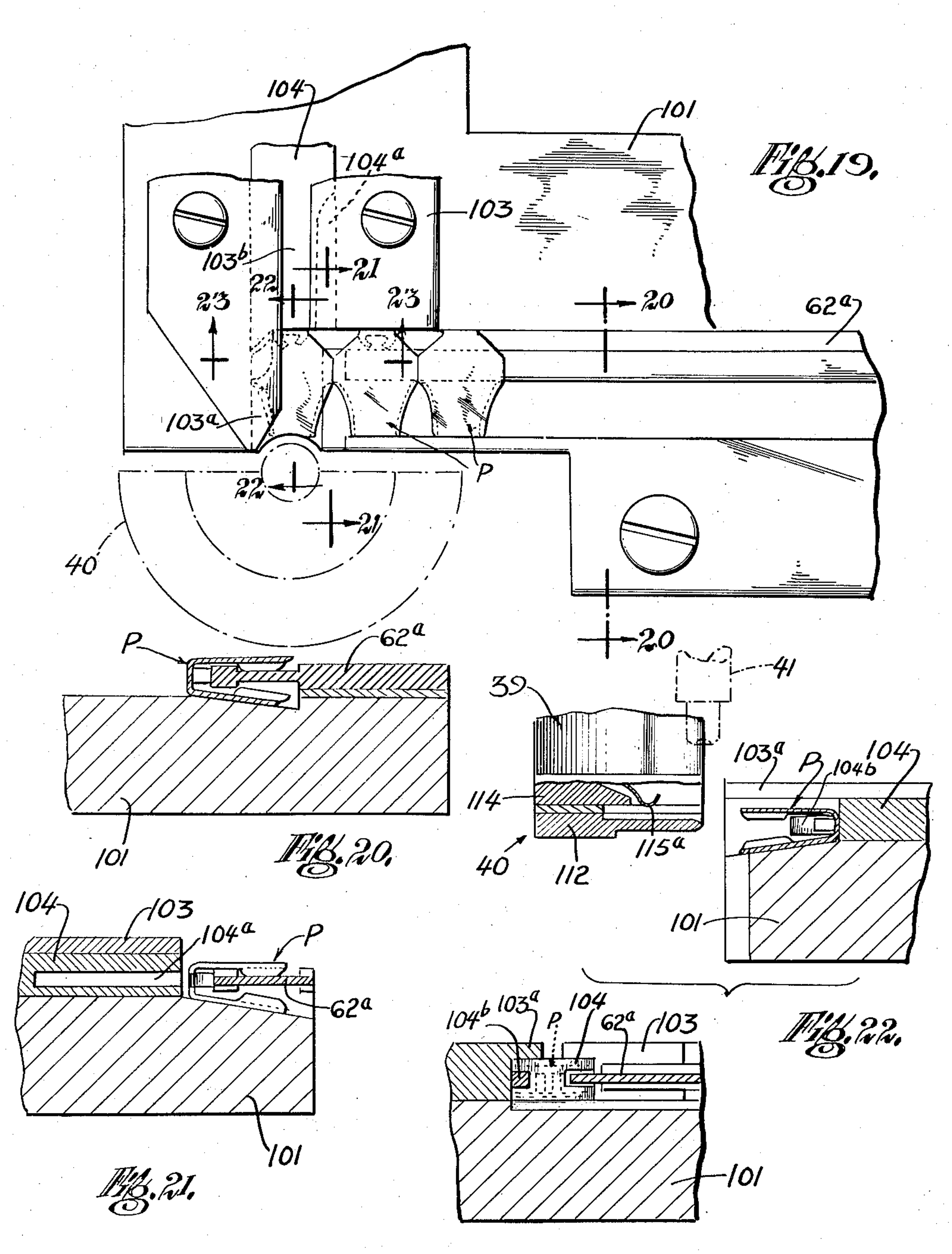
Figure 24:
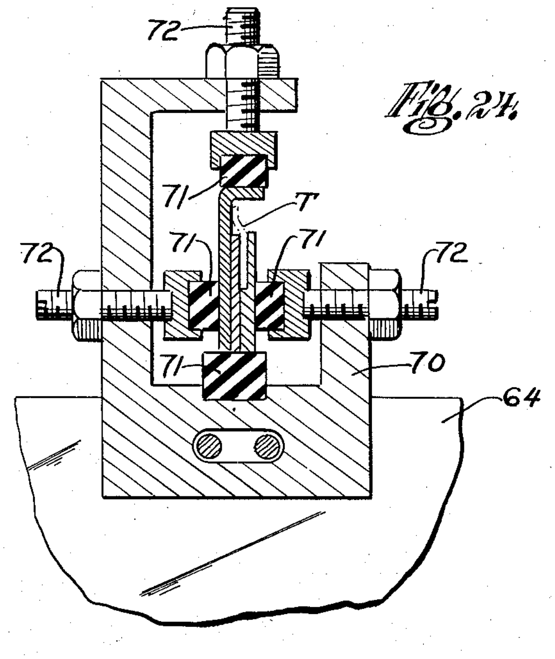
Figure 25:
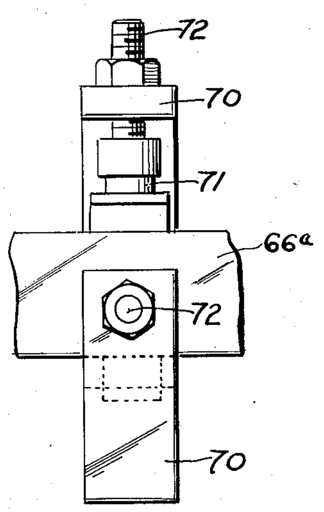
Figure 26:
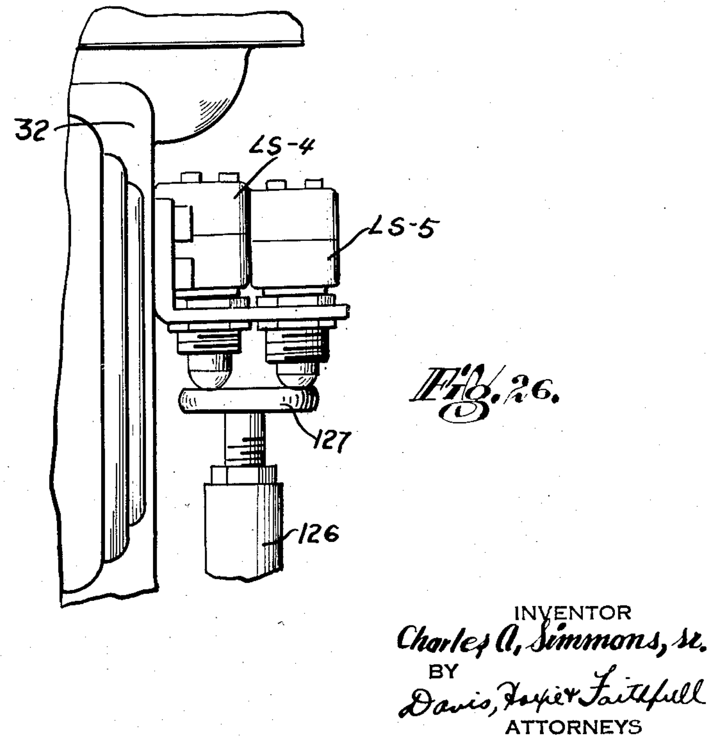

Fig. 16 is a view on the line 16—16 in Fig. 15, but showing the mandrel in the retracted position of the plunger, and showing also the slide for loading the slider body into the mandrel;

Fig. 17 is a plan view of the loading device for inserting the slider body into the mandrel;

Fig. 18 is a view on the line 18—18 in Fig. 17;

Fig. 19 is an enlarged plan view of part of the loading device illustrated in Fig. 17, showing a slider body in position for ejection into the mandrel;

Figs. 20, 21, 22 and 23 are sectional views on the lines 20—20, 21—21, 22—22 and 23—23, respectively, in Fig. 19;

Fig. 24 is a sectional view on the line 24—24 in Fig. 7;

Fig. 25 is a side elevational view of the device shown in Fig. 24;

Fig. 26 is a view on the line 26—26 in Fig. 5, and

Figure 27:
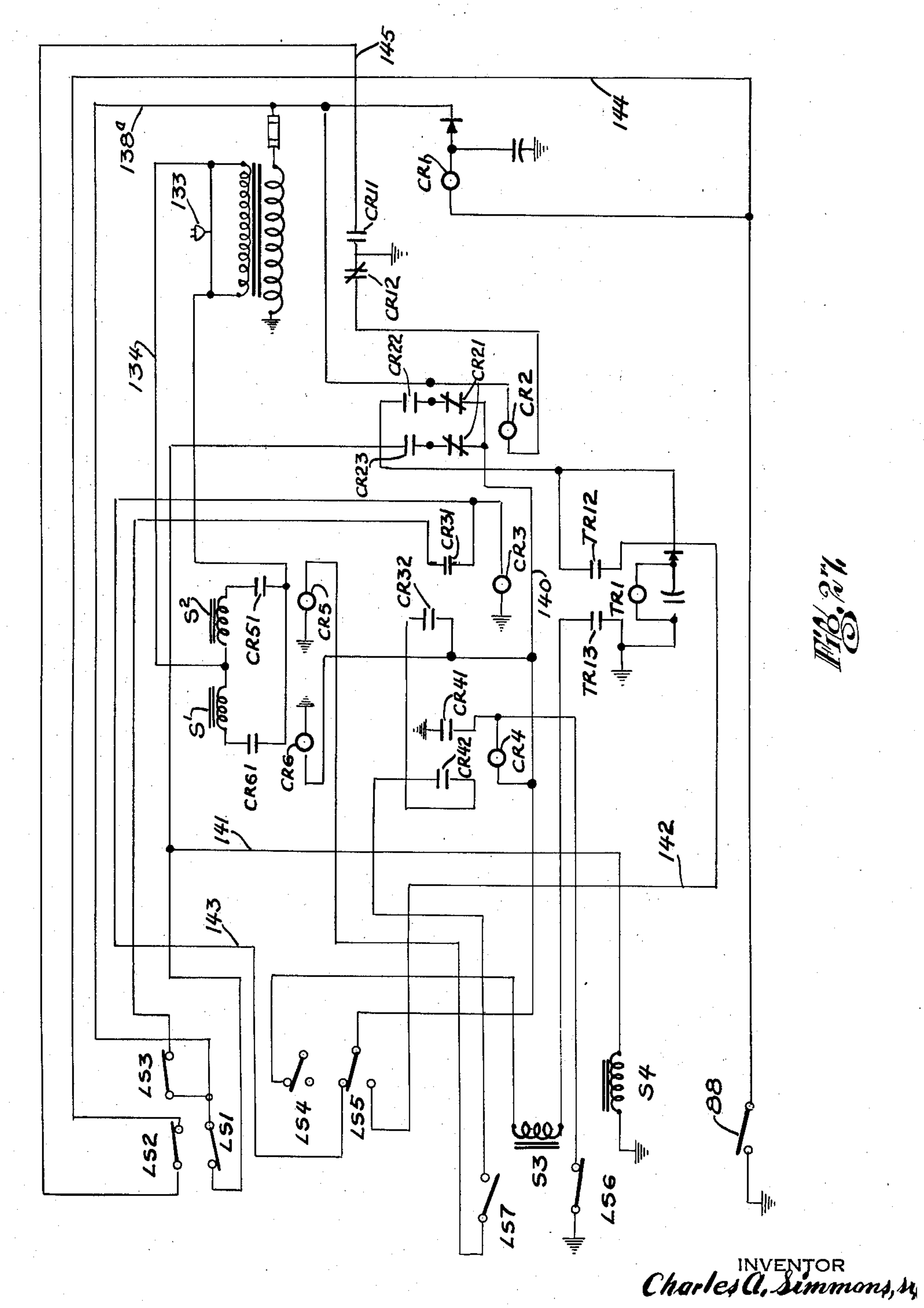

Fig. 27 is a schematic wiring diagram showing the electrical controls for the apparatus.

Figures 1, 2:
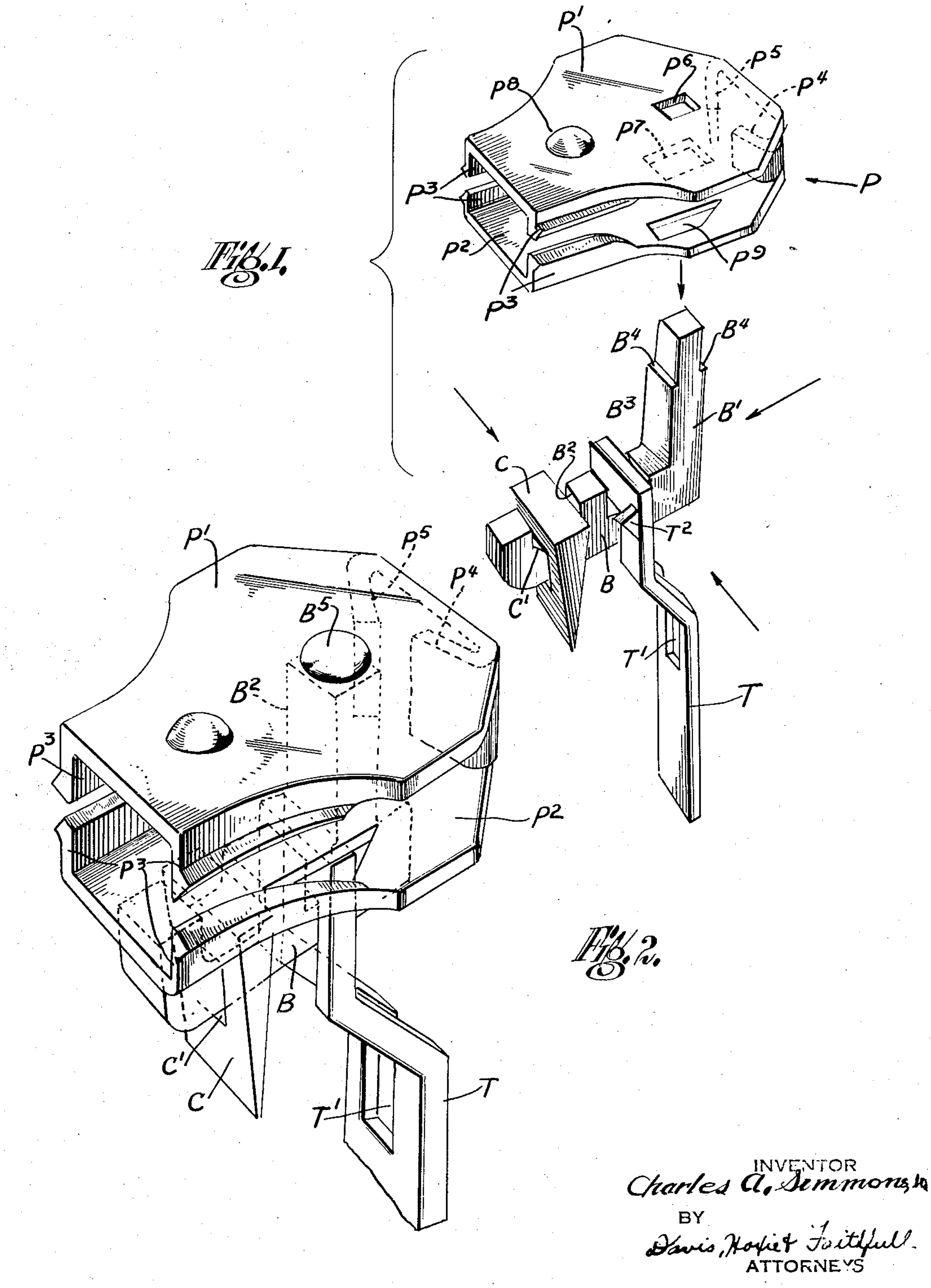
Fig. 1 is an exploded perspective view of the slider, showing the sub-assembly of the bail, pull-tab and cam in position for inserting the bail projection through the aligned holes in the slider body.
Fig. 2 is a perspective view of the completely assembled slider.

The slider (Figs. 1 and 2) comprises a body P having upper and lower guide plates P1 and P2 disposed in parallel spaced relation. These plates are made from a single sheet of metal so that the plates form spring jaws which are interconnected at one end to the body by an integral part of the plate. At the opposite end of the body P, the plates have opposed flanges P3 extending along the sides of the plates and forming a channel wherein the usual interconnecting elements on the stringers of the zipper are brought together and interleaved in the usual manner. Between the side flanges P3 and the interconnected ends of the plates, the slider body is open at the sides, to provide passages through which the two stringers of the zipper extend in converging relation toward the relatively narrow channeled part of the body. The part of the body which interconnects the two guide plates has tabs P4 and P5 at opposite sides of this part, which are bent inward between the plates, as shown in Figs. 1 and 2. Near the free ends of these tabs the guide plates are formed with aligned openings P6 and P7, which are square. The opening P6 in the upper plate is somewhat smaller than the underlying opening P7 in the lower plate. At the reduced portion of the slider body, the upper plate P1 is provided with an integral button or detent P8.

A bail B is provided for holding a pull-tab T and a cam C on the body P. The tab T and cam C are formed with substantially square openings T1 and C1, respectively, through which the bail extends. At one end, the bail B has a projection B1 extending laterally of the bail (upward in Figs. 1 and 2) and forming a bridging member which, in the assembled slider, extends through the aligned openings P7 and P6 in the slider body. Intermediate its ends, the bail is provided in its upper surface with longitudinally spaced notches B2 and B3 for receiving the cam C and tab T, respectively. Near its upper end, the bridging member B1 has a pair of external shoulders B4 facing the slider body P.

In assembling the slider, the bridging member B1 of the bail is inserted through the aligned openings P7 and P6 in the slider body, so that the lower surface of the upper plate P1 seats against the shoulders B4 on the bridging member and the lower plate P2 seats against the upper surface of bail B, thereby holding the cam C and tab T in their respective notches in the bail. In this position of the parts, the reduced end of the bridging member B1 projects through the opening P4 in upper plate P1, so that when this end of the member B1 is spun over, as shown at B5 in Fig. 2, the parts are held together. With the parts thus assembled, the pull-tab T can be swung freely in either direction on the bail B, since there is a clearance between the upper end of this tab and the adjacent lower plate P2 of the body. The cam C, on the other hand, fits snugly against the lower guide plate P2 so that when the cam is swung to the left (as viewed in Figs. 1 and 2), its wedging action forces the free end of the lower guide plate toward the upper guide plate. The slider is thus locked in a closed or operating position, the cam C being held with one of its tapered faces substantially flat against the lower plate P2. In other words, in the closed position of the slider, the enlarged or upper end portion of the wedge shaped cam is wedged between the bottom of its notch B2 and the lower surface of the plate P2. To release the slider, as when the zipper has become jammed, the cam C is swung back to its position shown in Figs. 1 and 2, wherein the top or enlarged end of the cam is flush with the upper surface of bail B. The spring action of the lower guide plate P2 thus returns this plate to its relatively open position against the upper surface of bail B. The cam C may be swung to the closed or locking position by swinging the tab T to the left (as viewed in Figs. 1 and 2). A detent T2 on the tab prevents swinging of the cam C to the right. When the cam C is swung to the left to its locking position, the detent T2 on the tab is adapted to enter a recess P9 in the bottom plate P2, so that the tab can be swung to the left until it is substantially parallel with the adjacent plate P2.

A slider of the construction described above is disclosed in greater detail in my copending application Serial No. 335,696 filed February 9, 1953.

A slider assembling apparatus, as illustrated, comprises a table 30 supporting a post 31. Secured to the upper portion of the post is a head 32 in which a plunger 33 is mounted for vertical movement. The plunger 33 may be mounted in the head 32 in the same manner as in a drill press, the plunger being splined in the head to permit raising and lowering of the plunger relative to the head while preventing rotation of the plunger. A yoke 34 is secured to the lower portion of the plunger. Within the plunger is a rotatable shaft 35 extending downward through the yoke 34. The shaft 35 is mounted in the plunger 33 by suitable bearings (not shown) which permit rotation of the shaft while preventing vertical movement of the shaft relative to the plunger. A plate 36 is provided with upwardly extending rods 37 straddling the rotatable shaft 35 and slidable in the ends of the yoke 34. Downward movement of the plate 36 and rods 37 relative to yoke 34 is limited by suitable stops (not shown) within the yoke. The plate 36 is urged to its lowest or stopped position relative to yoke 34 by means of compression springs 38 coiled around the rods 37 and interposed between plate 36 and yoke 34. The plate 36 carries a depending spool 39 secured to the plate and aligned vertically with the rotatable shaft 35. A body holder or mandrel 40 (Fig. 5) is secured to the lower end of the spool 39. The rotatable shaft 35 is provided at its lower end with a spinning tool 41 extending downward through an opening in plate 36 and through the spool 39, as shown particularly in Fig. 13.

A bed plate 42 for supporting the assembling mechanism is mounted on vertical members 43 on the table 30. A bushing 31*a* is secured to the bed plate 42, and the press post 31 extends through this bushing and an aligned hole in the plate 42. By means of a suitable clamp (not shown), the post 31 may be held in any desired vertical or angular position in the bushing 31*a*. A horizontal plate 44 is mounted on top of the post 31 (Fig. 5) and supports a worm-and-wheel type of speed reducer 45. The speed reducer 45 is driven by a pulley 45*a* from a belt 45*b* connected to a driving motor to be described presently. The output shaft 45*c* of the speed reducer is connected to a horizontal shaft 46 through a coupling 47, the shaft 46 being journalled in brackets 48 on the plate 44. Intermediate its ends, the shaft 46 carries a cam 49 engaging a roller or cam follower 33*a* on the upper end of the plunger 33 (Fig. 5). The follower 33*a* is held against the cam 49 by a tension spring 50 connected between the lower portion of plunger 33 and its housing or head 32. Thus, the rotation of shaft 46 will cause cam 49 to lower the plunger 33 against the action of spring 50, which will return the plunger to its raised position when the shallow portion of the cam permits such return movement. The rotatable shaft 35 in the plunger is driven from an electric motor 51 (Fig. 3) which operates continuously as long as the apparatus is functioning. The motor 51 is secured in any suitable manner to the head or housing 32 and is connected by means of a belt 52 (Fig. 5) to the rotatable shaft 35. The shaft 35 and spacer 41 are, therefore, rotated continuously during operation of the apparatus.

The cam shaft 46 is driven through the speed reducer 45 from an electric motor 54 mounted below the table 30 on a bracket 54*a* (Fig. 3). The motor 54 is also energized continuously, but is provided with a clutch 55 for coupling and uncoupling motor shaft to a drive shaft 54*b*. The clutch 55 may be built into the motor 54 (as, for example, in the type of motor made by Singer Manufacturing Company) the clutch 55 is operated by an actuating lever 55*a*. The drive shaft 54*b*, which is the output shaft of the clutch, is connected through pulley 56 and belt 45*b* with the speed reducer 45.

At its free end, the vertical movements of clutch lever 55*a* are guided and limited by a guide 58 mounted on a bracket 58*a* depending from the table 30. A tension spring 59 (Fig. 3) is connected between the free end of clutch lever 55*a* and bracket 58*a* and normally holds the lever in its raised position wherein the drive shaft 54*b* is unclutched from motor 54. A solenoid S–2 is suitably mounted on the table supports below the clutch lever 55*a*. The plunger 60 of the solenoid is connected to the lever 55*a* so that energizing of solenoid S–2 lowers this lever against the action of spring 59 and thereby clutches the drive shaft 54*b* to motor 54. The cam shaft 46 will thus be rotated through belt 45*b* and speed reducer 45. Upon deenergizing of solenoid S–2, the spring 59 returns lever 55*a* to unclutch shaft 54*b* from the motor, whereby the rotation of cam shaft 46 will be arrested.

Referring now to Figs. 3 and 4, a feed hopper 62 for the slider bodies P is mounted on a stand 63 on the table 30, so that the hopper is in an elevated position relative to the bed plate 42. A chute 62*a* extends downward and to the left (Figs. 3 and 4) from hopper 62, to the assembly zone of the apparatus, the lower end of the chute being connected to part of the assembly mechanism mounted on a die plate 64 (Figs. 4, 5 and 7). The hopper 62 and its chute 62*a* form a feeder of the vibratory type, such as the "Syntron" parts feeder made by Syntron of Homer City, Pennsylvania. A feeder of this type is disclosed in the Syntron catalog No. 531, and a vibratory feeder for feeding zipper parts is disclosed particularly on page 82 of this catalog. Briefly, such feeders operate automatically, through a rapid vibratory action, to place the slider bodies or other parts in proper position on the chute and feed them in sequence along the chute to the desired destination. The vibratory part of the feeder, which is operated electrically, is indicated at 66*b* in Figs. 3 and 4.

A similar hopper 65 for the bails B is mounted at the front of the machine on the table 30 (Fig. 4) at about the same level as or slightly higher than the die plate 64. A chute 65*a* extends from hopper 65 to the die plate, the feeder 65—65*a* being operated by an electrical vibrator 65*b*. A hopper 66 for the pull-tabs T is mounted on the table at about the level of the die plate 64 and has a chute 66*a* along which the tabs are fed in sequence to the left (as viewed in Figs. 3 and 4) to the die plate; the electric vibrator for the feeder 66—66*a* being shown at 66*b*. Another hopper 67 for the cams C is mounted on the opposite end of the table from hopper 66 and at about the same level. The cam hopper 67 has a chute 67*a* along which the cams are fed in sequence to the right (as viewed in Figs. 3 and 4) to the die plate 64. The electrical vibrator for the feeder 67—67*a* is shown at 67*b*.

The feeders 62—62*a*, 66—66*a* and 67—67*a*, for the slider bodies, the pull-tabs and the cams, respectively, are operated continuously so that these elements are fed to the assembling zone above the die plate 64 as fast as the assembly mechanism will receive them. In other words, as soon as the slider has been assembled and removed from the assembling mechanism, these feeders present a new set of slider elements to the assembling mechanism, as will be described in greater detail presently. The feeder 65—65*a* for the bails B may be operated continuously or intermittently, as will be presently described.

The tab chute 66*a* has an extension 66*c* (Figs. 4, 7 and 8) extending partly across the upper face of die plate 64 below the body chute 62*a*. The tab chute 66*a* is secured to plate 64 by a fixture 70 which is shown particularly in Fig. 24. As there shown, the fixture has rubber blocks 71 supporting the chute 66*a*, the chute being clamped between these blocks by means of set screws 72 on the fixture body. In this way, the chute is connected to the die plate 64 without impairing the necessary vibrations of the chute incident to feeding of the tabs. The cam chute 67*a* has a similar extension 67*b* overlying the die plate and secured thereto by means of a fixture 73 similar to the fixture 70. Another fixture 74 (Fig. 4) secures the bail chute 65*a* to the die plate 64.

As shown particularly in Fig. 10, the bail chute 65*a* comprises side strips 65*c* and 65*d* bolted together, and a top strip 65*e* suitably secured on top of the strip 65*d*. These three strips define a groove 65*f* for receiving the bails B with the bail proper resting on the bottom of the groove and the bridging member B1 extending upward toward the top strip 65*e*.

A die member 75 is mounted on the die plate 64 (Figs. 7 and 8). As shown particularly in Figs. 8 and 9, the die 75 is formed with a groove 66*d* leading to the left from the tab chute extension 66*c*. Similarly, the die has a groove 67*d* leading to the right from the cam chute extension 67*c*. The groove 66*d* terminates in a tab space 66*e*, while the groove 67*d* terminates in a cam space 67*e*. The spaces 66*e* and 67*e* extend parallel to each other but are separated by a fixed partition 76 forming part of the die 75. As shown particularly in Figs. 11 and 12, the spaces 66*e* and 67*e* are defined at the bottom by a yielding support or plunger 77 suitably guided for vertical movement in the die 75. The support 77 is normally urged against the bottom of the fixed partition 76 by means of a compression spring 78 interposed between plate 64 and support 77.

It will be understood that in the normal or raised position of the yielding support 77, its upper surface at one side of the partition 76 forms an extension of the bottom of groove 66*d* for the pull-tabs, so that each tab is fed into the die space 66*e* above the support 77 in the position shown in Fig. 12. Similarly, the raised portion 77*a* at the opposite side of partition 76 forms at the top of the yielding support 77 an extension of the bottom of groove 67*d* for the cams. Thus, each cam is fed into the die space 67*e* in the position shown in Fig. 12, wherein the reduced end of the cam C rests upon the top of the raised portion 77*a* of support 77. The horizontal movement of the cam C along the die space 67*e* is arrested by a stop 67*f*, and the horizontal movement of the tab T in the opposite direction along the die space 66*e* is arrested by a stop 66*f*.

The die plate 75 also has a groove 65*g* forming an extension of the bail chute 65*a*. This bail groove 65*g* extends perpendicular to the tab groove 66*d* and cam groove 67*d* and is aligned with the openings T1 and C1 in the tab and cam, respectively, when the latter are in their stop positions against the parts 66*f* and 67*f* and the fixed partition 76 is aligned with and forms an extension of the die groove 65 for the bails. Thus, when a bail B in the groove 65*g* is fed toward the partition 76, it is guided by the partition groove 76*f* through the openings in the tab T and cam C in the die spaces 66*e* and 67*e*, respectively, as indicated in broken lines in Fig. 12. This is so because a yielding support 77 holds tab T and cam C with their openings at the level of the bail B, and the stops 66*f* and 67*f* hold the tab and cam with their openings in horizontal alignment with the bail B.

The movement of the bail B to project it through the tab and cam openings may be effected by pressure from the following bails B due to the feeding action of the bail chute 65*a*. In some instances, however, it may be desirable to provide a supplemental feeding action to force the bail through the tab and cam, and for this purpose the power operated device shown in Figs. 7, 8 and 9 may be used. As there shown, the power feeding or bail-lacing device comprises an air cylinder 80 mounted on the die plate 64 and containing a piston (not shown). A piston rod 81 extending from the cylinder is connected by a link 82 to a lever 83 pivotally mounted at 84 on a plate 85 secured to die 75. The cylinder 80 contains a spring (not shown) normally holding the piston rod 81 in its retracted position, wherein the lever 83 engages a stop 86 on plate 85. Upon admission of air under pressure into cylinder 80, the piston rod 81 is advanced to swing the lever 83 clockwise (as viewed in Figs. 8 and 9) about its pivot 84, whereby a finger 83*a* on the lever engages the back of the upwardly extending bridging member B1 of the bail and forces the bail through the tab T and cam C, as indicated by the broken lines in Figs. 9 and 12. When the air supply to the cylinder 80 is cut off, the spring within this cylinder retracts the piston rod 81 and thereby returns lever 83 to its retracted position wherein the finger 83*a* is removed from the path of the bridging member B1 on the next bail B.

The lacing movement of the bail B through the aligned openings in tab T and cam C is arrested by a stop 88 (Figs. 9, 11 and 12). In this stopped position of the bail, the notches B2 and B3 are in the openings of the cam and tab, respectively, so that the upper transverse parts of these elements directly overlie the respective notches. The stop 88 forms an electrical contact for completing one of the circuits of the control means for the apparatus. For this purpose, the stop 88 is formed by one end of a metal arm secured between insulating members 89 and 89*a* on the die 75. The other end of this conducting arm is secured to a metal bracket 90 mounted on a set screw 91 threaded in the die 75. By means of a terminal screw 92, the contact stop 88 may be connected in the control circuit, as will be described presently. It will be understood that the bracket 90 and terminal screw 92 are insulated from the die 75, as by means of an insulating head 91*a* on the screw 91.

As shown particularly in Fig. 11, the members 64, 75 and 89 may be provided with a passage 94 connected to a suitable source of compressed air whereby the air blown through this passage prevents dust from accumulating on contact 88 and the adjacent parts of the die.

In order to lock the bail B1 in its stopped position, during the subsequent assembly operations, I provide a clamping means comprising a wedge 96 slidable in a groove in the die 75 (Fig. 9), the wedge groove intersecting the bail groove 65*g* near its junction with the tab space 66*e*. The wedge 96 is pivotally connected to one end of a lever 97 which is pivoted intermediate its ends at 97*a*. A tension spring 98 is connected between lever 97 and the bail chute 65*a*, this spring serving to hold the wedge 96 in its retracted or inoperative position. The end of lever 97 remote from the wedge 96 is pivotally connected to the plunger 99 of a solenoid S-4 (Figs. 7 and 8). When solenoid S-4 is energized, its plunger 99 draws the adjacent end of lever 97 to the right (as viewed in Fig. 9) against the action of spring 98, thereby advancing the wedge 96 into locking engagement with the bail B1 in its stop position, so that the bail is held firmly against displacement in the die groove 76f. Upon deenergizing or solenoid S–4, the spring 98 retracts the wedge 96 to release the bail B.

A fixture 101 for the slider body loading mechanism is mounted on supports 102 on the die plate 64 (Figs. 5 and 18). The fixture 101 is located above and in front of the die 75, as best shown in Fig. 5. A guide plate 103 is secured on the fixture 101 and forms an undercut groove 103b extending perpendicular to the body chute 62a (Fig. 17). The chute 62a terminates at a cutaway portion of guide plate 103, the end of the chute being located directly opposite and overhanging part 103a of this plate. The chute 62a is secured in this position in any suitable manner, as by means of screws 101a. A plunger or ejector slide 104 is slidable in the groove 103b and is normally held in a retracted position by means of a tension spring 105 connected between the slide 104 and a pin 106 mounted on a bracket 107 on the die plate 64. As shown particularly in Figs. 16 and 21, the slide 104 is formed at its ejecting end with a groove 104a in the side of the slide adjacent the end of chute 62a (see also Fig. 17). Thus, when the slide 104, is advanced, the groove 104a receives the extreme end of chute 62a while discharging the slider body into the mandrel, as will be described presently. At the side of slide 104 opposite the groove 104a, the slide has a projection 104b (Fig. 16) adapted to enter the space between the body plates P1 and P2 at one side of the body, while the end of the slide proper engages the body P at the interconnected ends of its guide plates.

The actuator for the slide or body ejector 104 comprises a solenoid S–3 mounted on the bracket 107 (Figs. 5 and 7). The plunger 110 of solenoid S–3 is connected at one end to the slide 104 and is provided at the other end with a pin 110a adapted to operate a pair of micro-switches LS–6 and LS–7 secured to the bracket 107. In other words, when solenoid S–3 is deenergized so that spring 105 holds slide 104 in its retracted position, the pin 110a is held against the micro-switch LS–7 so as to hold its switch open, as shown in Fig. 5. On the other hand, when solenoid S–3 is energized to advance the slide 104 against spring 105, the pin 110a disengages micro-switch LS–7 so that the latter closes, the pin then engaging micro-switch LS–6 to open the latter. Upon deenergizing of solenoid S–3, the spring 105 retracts the plunger and slide so that pin 110a disengages micro-switch LS–6 to allow closing of the latter and then re-engages switch LS–7 to open this last switch.

The mandrel or body holder 40 will now be described in detail, with particular reference to Figs. 13–16 and 22. As previously mentioned, this mandrel is mounted on the bottom of the spool 39 carried by the plunger. The mandrel comprises a lower plate 112, and intermediate plate 113 and an upper plate 114. The lower plate 112 has an undercut portion 112a in its lower surface and is provided in its upper surface with two recesses 112b tapering inward from the front edge of this plate to its rear edge. These recesses are adapted to receive the side flanges P3 of the upper guide plate P1 of the slider body, as best indicated in Figs. 15 and 16. The lower plate 112 also has at its front edge a notch 112c adapted to receive the end of the ejector projection 104b in the advanced movement of the ejector (Fig. 16). The intermediate plate 113 has in its front portion a notch 113a conforming generally to the configuration of the reduced end portion of the slider body P (Figs. 14 and 16). The upper plate 114 has in its upper surface a groove 114a extending from the rear edge of this plate toward the front edge and terminating in a notch 14b in the front portion of the plate.

It will be understood that the mandrel plates 112—114 are clamped together by screws (not shown) extending through aligned holes in these plates (Fig. 14) and threaded into the bottom of the supporting spool 39. Before the mandrel parts are thus assembled, a spring clip 115 is inserted in the groove 114a of the upper plate, so that this clip is clamped between the upper plate and the spool 39. The curved or free end 115a of the spring clip as thus clamped, extends through the notch 114b in the upper plate and is disposed in the underlying notch 113 directly above that part of the lower plate 112 which separates the recesses 112b. Accordingly, when a slider body P is inserted into the mandrel by the ejector 104, button P8 on the upper guide plate P1 of this body engages and raises a spring clamp end 115a so that the slider body is held by the spring clip in the mandrel (Fig. 15).

In this inserted position of the slider body P, its upper and lower guide plates P1 and P2 straddle the lower plate 112 with the side flanges P3 of the upper guide plate disposed in the tapered recesses 112b in the lower plate 112 of the mandrel, and with the reduced end of the slider body seated against the bottom of notch 113a in the intermediate plate 113 of the mandrel (Figs. 15 and 16).

This loading of the slider body P into the mandrel is effected by the ejector 104 while the plunger 33 is in its uppermost or retracted position, at which time the relative positions of the mandrel 40 and the ejector slide 104 are indicated in Fig. 22. Thus, with a slider body P in its stopped position in the guide plate groove 103b (Fig. 19), operation of the ejector slide 104 by its solenoid S–3 will discharge the slider body from the guide plate 103 and force it into the mandrel where it is held as indicated in Fig. 15. During this ejection of the slider body P, it is guided on one side by the guide plate 103 and at the other side by the projecting end of the body chute 62a, as indicated in Fig. 23. Also, the projection 104b on the ejector slide enters between the guide plates P1 and P2 of the slider body to stabilize it during its transfer into the mandrel. Upon retraction of the ejector slide 104, slider body P is held in the mandrel by the spring clip 115a (Fig. 15), and the next slider body P will be fed to the stop position in guide plate 103 of the assembly mechanism, where it will await the next operation of the slide ejector 104 in the next operating cycle of the apparatus.

Upon completion of the body loading operation, as previously described, the plunger 33 is ready to be actuated. This actuation does not occur until the bail B has been laced through the tab T and cam C and moved into its stopped position against contact 88, because engagement of the bail (which is electrically grounded to the machine) with this contact is necessary to establish the energizing circuit for clutch solenoid S2 so as to clutch the cam shaft 46 to motor 54 and thereby rotate the plunger-actuating cam 49, as will be described presently. Upon actuation of plunger 33 in response to engagement of contact 88 by the bail, the slider body P held in the plunger mandrel 40 is moved downward to project the bridging member B1 of the bail through the aligned openings in the slider body and seat the shoulder B4 against the lower surface of the upper guide plate P2 (Fig. 15). This downward movement of the mandrel also engages the lower guide plate P2 of the slider body with the upper ends of the tab T and cam C, so that further downward movement of the plunger and mandrel forces the elements T and C downward against the yielding support 77, whereby the elements T and C are depressed into their respective notches B2 and B3 in the bail and held there by engagement of the lower guide plate P2 with the upper surface of bail B. Thereupon, the final downward movement of plunger 33 causes the mandrel 40 to yield relative to the plunger and against the action of springs 38 (Fig. 3), so that the spinning tool 41 is forced by the plunger against the projecting upper end of bridging member B1 and spins this end over the upper guide plate P2 of the slider body, as shown at B5 in Fig. 2.

During this plunger operation, the solenoid S–4 is energized so as to lock the bail B in its stopped position through the action of wedge 96. Also, the slider body P is held firmly in the mandrel 40 by the clip 115. In the pressing of the slider body against the bail and bridging elements B—B1, upward displacement of the body relative to the mandrel is prevented by the parts of mandrel plate 114 overhanging the upper body plate P2, and by the part of the lower mandrel plate 112 overhanging the lower body plate P2; and lateral displacement of the slider body relative to the mandrel is prevented by engagement of the body with the edges of notch 113A in the intermediate plate 113 of the mandrel and by the tapered recesses 112B which receive the side flanges P3 in the lower plate 112 of the mandrel (Figs. 15 and 16). When the spinning by tool 41 has been completed, the bail locking device 96 is released through de-energizing of its solenoid S–4. Further rotation of cam 49 then allows the plunger to retract under the action of spring 50, so that the assembled slider is lifted by the mandrel from the die 75. Before the plunger reaches its retracted position, the assembled slider is ejected from the mandrel into a discharge chute 118 having an entrance end 118A (Figs. 5 and 18) located adjacent the path of the mandrel and between the die 75 and the body loading fixture 101. The ejection of the slider into the discharge chute 118 may be effected in any suitable manner, as by means of an air blast from a nozzle 119 located directly opposite the chute entrance 118A, as best shown in Fig 5. The timing of this air blast is under control of a cam 120 on cam shaft 46. During each revolution of the cam shaft the cam 120 swings a lever 121 pivotally mounted on plate 44 and having at its free end a roller 121A engageable by cam 120. When thus actuated the lever 121 operates an actuator 122 (Fig. 6) for a normally closed valve 123 located in the pneumatic pipe line 124 connected to the nozzle 119. When the valve 123 is thus opened, the air blast from nozzle 119 impinges against the lower part of the slider hanging from the mandrel 40 and blows it into the discharge chute 118 where it falls by gravity to a suitable receptacle (not shown). It will be understood that this ejecting movement of the assembled slider from the mandrel is from left to right, as viewed in Fig. 15. The cam 49 provides a slight dwell period for the plunger while the assembled slider on the mandrel is between the blower nozzle 119 and the chute entrance 118.

Upon completion of this dwell period, the cam 49 allows the plunger to return to its fully retracted position, thereby actuating two micro switches LS–4 and LS–5 mounted on the plunger housing 32 (Figs. 3, 5, and 26). A vertical rod 126 is secured to the lower part of plunger 33 (Fig. 3) and is provided at its upper end with an adjustable member 127 for simultaneously engaging the actuators of the switches LS–4 and LS–5. These switches can be actuated only by full return movement of plunger 33, and their actuation represents the end of an operating cycle of the apparatus, the clutch solenoid S–2 being deenergized to stop the rotation of cam shaft 46.

The control system for the apparatus serves to cycle it through the steps previously described and to recycle it so that the assembled sliders are discharged at a rapid rate from the chute 118, the operation continuing as long as the various hoppers supply the slider elements to the assembly mechanism. The control system may take various forms, but a preferred form is illustrated in Fig. 27. This form makes use of the various solenoids and switches previously described and also includes three micro switches LS–1, LS–2 and LS–3 mounted on a stationary plate 130 secured to the horizontal plate 44 (Fig. 5). These three switches are spaced around the axis of a shaft 45c driven by the speed reducer 45. The shaft 45c has a cam 131 which, during cycling of the main cam shaft 46, actuates the switches LS–1, LS–2 and LS–3 in sequence and in the order named.

Referring to Fig. 27, the system there shown comprises an electrical outlet plug 133 for connection to a 110 volt line. By means of conductors 134, the line is connected across the bail feed solenoid S–1 and the drive clutch solenoid S–2, through relay switches CR61 and CR51, respectively. These switches are operated by relays CR6 and CR5, respectively.

A transformer 136 has its primary connected across the current supply line, the secondary of the transformer having one terminal ground at 137 and the other terminal connected to a wire 138. The voltage provided by the transformer secondary is approximately 24 volts.

A time delay relay CR1 is adapted to be energized from wire 138 through the work contact 88 when the latter is closed by the bail B. When relay CR1 is deenergized, its switch CR12 is closed and its switch CR11 open. The closed switch CR12 establishes a circuit from wire 138 through a relay CR2 and through switch CR12 to ground. With relay CR2 thus energized, its switches CR21 are closed and its switches CR22 and CR23 are open. In this condition, relays CR6 are energized from wire 138 through switches CR21, wire 140, and relay CR6 to ground, thereby holding relay switch CR61 closed so as to energize the bail feed solenoid S–1. It will be understood that this solenoid may be the solenoid which operates the bail feeder vibrator 65*b*, or it may be a solenoid valve which, when energized, admits a momentray flow of air to the air cylinder 80 for operating the finger 83*a* to advance the bail B.

The relay CR5 for energizing the drive clutch solenoid S–2 (to cycle the cam shaft 46) is adapted to be energized from ground through the coil of relay CR5, switch LS–7 (which is closed by the the slider body ejector 104 upon return movement of the ejector), contact CR42 of relay CR4, contact CR32 of relay CR3 to wire 140. It will be noted that this wire can be energized through relay switch CR21 as well as through contact 6U of the plunger-operated switch LS–5. That is, in the lower position of switch LS–5, its contact 6U is adapted to be connected through wire 142, switch TR12 of timer relay TR1, and relay switch CR22 when the relay CR2 is deenergized. Also, with switch LS–5 in its upper position, the contact 6U is adapted to be connected through wire 143, switch CR31 of relay CR3, switch LS–3, and wire 138*a* to the current source.

The bail lock solenoid S–4 is normally deenergized, as its wire 141 under normal conditions terminates at the open switches LS–3 and CR23.

Assuming that the plunger is in its fully retracted position so that switches LS–4 and LS–5 are positioned as shown in Fig. 27, the bail feed solenoid S–1 will be energized as previously described to lace the bail through the tab and cam, so that the bail engages the contact 88. When this occurs, relay CR1 is energized so as to open its switch CR12 and deenergize relay CR2. Also, relay switch CR11 is closed to form a holding circuit from the current source through relay CR1, wire 144, switch LS–2, wire 145 and relay switch CR11 to ground, this holding circuit being independent of the work contact 88.

Deenergizing of relay CR2 deenergizes the bail feed solenoid S–1 by deenergizing its relay CR6, thereby opening switch CR61. At the same time, relay switch CR23 is closed to establish a circuit from the current source through wire 138, switch CR23, wire 141 and solenoid S–4 to ground, thereby locking the bail in its stopped position by means of the wedge 96. Simultaneously, the relay switch CR22 is closed so as to establish a circuit from the current source through the timer relay TR1 to ground, thereby closing relay switches TR12 and TR13. The closing of relay TR1 applies voltage to the lower contact of plunger switch LS–5. The closing of relay switch TR13 energizes the solenoid S–3 for the body ejector slide 104, by a circuit extending from ground through this solenoid, switch LS–4, LS–5, wire 143, relay switch CR31, switch LS3, and wire 138 to the current source. It will be noted that at this time the relay CR3 is energized to close its contacts CR31—32, through a holding circuit including switches CR31 and LS-3.

Upon forward movement of the body ejector by solenoid S-3, contact LS-6 is closed so as to energize relay CR 4. The solenoid S-3 is energized only during the time delay period provided by relay TR1. When this relay opens it deenergizes solenoid S-3 to allow retraction of the body ejector 104, thereby closing switch LS-7. This energizes relay CR5 through contacts CR42 and CR32, whereby relay switch CR51 is closed to energize the drive clutch solenoid S-2. As a result, the cam shaft 46 is driven through one revolution to operate the plunger 33 and switches LS-1, LS-2 and LS-3. During this revolution, the bail lock solenoid S-4 is momentarily deenergized to release the bail by momentarily closing of switch LS-3, which short circuits the solenoid S-4 to allow the return movement of the plunger to withdraw the assembled slide from the die. During the downward movement of plunger 33 and until it is completely retracted at the end of the cycle, the switches LS-4 and LS-5 are in the positions opposite to those shown in Fig. 27. Upon return of the plunger to its retracted position, it again actuates switches LS-4 and LS-5, the purpose of which is to prevent further operation if the mandrel 40 does not return completely to the body loading position. It will be noted that near the end of the complete cycle of cam shaft 46, switch LS-2 is momentarily opened to break the holding circuit for relay CR1; and switch LS-3 is momentarily opened to break the holding circuit for relay CR3.

I claim:

1. Apparatus for assembling sliders of the character described, which comprises a die having a tab-receiving space and a stop at one extremity of said space, means for feeding apertured pull-tabs one-by-one into said space and against the stop, the die also having a groove aligned with the tab opening in the stopped position of the tab, means for moving notched bails one-by-one along said groove and through the opening of a tab is said space, a stop engageable by the bail to locate it in a stopped position wherein a notch of the bail is in the tab opening, a plunger adapted to be advanced toward and retracted from the die, a mandrel carried by the plunger, means for loading slider bodies one-by-one into the mandrel, each body having opposed openings and being held by the mandrel with said last openings aligned with a lateral member on the bail in its stopped position, means for advancing the plunger to project said lateral member through the opposed openings in the body and press the body against the bail on the die, a spinner engageable with the end of said lateral member to spin it over the body, and means for removing the assembled slider from the mandrel.

2. Apparatus according to claim 1, in which the die includes a yielding support for the tab in said space, said support being yieldable in the direction of the plunger movement toward the die, whereby the tab yields under pressure of said body from the plunger and enters said bail notch during said projection of the lateral member through the slider body.

3. Apparatus according to claim 1, in which said spinner is carried by the plunger.

4. Apparatus according to claim 1, in which said spinner is carried by the plunger, the mandrel being yieldingly mounted on the plunger for yielding movement relative to the plunger and spinner, whereby the spinner is engageable with said end of the lateral member by further advancing of the plunger after engagement of the slider body with the bail.

5. Apparatus according to claim 1, in which said slider removing means is located adjacent the path of the mandrel and between the positions to which the mandrel is advanced and retracted by the plunger.

6. Apparatus according to claim 1, in which said slider removing means is a blower nozzle.

7. Apparatus according to claim 1, in which said slider removing means is located adjacent the path of the mandrel and between positions to which the mandrel is advanced and retracted by the plunger, said body loading means being aligned with the mandrel in the retracted position of the plunger.

8. Apparatus according to claim 1, in which said loading means include a chute for feeding the slider bodies in succession, a guide plate forming a groove at the discharge end of the chute, said groove extending substantially perpendicular to the chute and toward the mandrel in the retracted position of the plunger, one side of the groove forming a stop for a slider body fed along the chute, and an ejector slide movable in the groove to transfer the body from said last stop into the mandrel.

9. Apparatus according to claim 1, in which said slider removing means is located adjacent the path of the mandrel and between the positions to which the mandrel is advanced and retracted by the plunger, said body loading means being aligned with the mandrel in the retracted position of the plunger, and means operable by the plunger for preventing operation of said body loading means except when the plunger is in its retracted position.

10. Apparatus according to claim 1, comprising also control means including said bail stop for operating said plunger advancing means.

11. Apparatus according to claim 1, comprising also a locking device adjacent the stopped position of the bail and operable to lock the bail in said last position during said projection of the lateral member through the slider body.

12. Apparatus according to claim 1, comprising also a locking device adjacent the stopped position of the bail and operable to lock the bail in said last position during said projection of the lateral member through the slider body, and means for releasing the locking device prior to retraction of the plunger.

13. Apparatus according to claim 1, in which the die also has a cam-receiving space and forms a stop for a cam in said last space, and means for feeding perforated cams one-by-one into said space and against said last stop, whereby the cam opening is aligned with the bail stop and with the opening in the tab in said tab-receiving space, the cam-receiving space being so positioned that when the bail is moved against the bail stop a second notch in the bail is located in the opening of the cam in said cam-receiving space.

14. Apparatus according to claim 1, in which the die also has a cam-receiving space and forms a stop for a cam in said last space, and means for feeding perforated cams one-by-one into said space and against said last stop, whereby the cam opening is aligned with the bail stop and with the opening in the tab in said tab-receiving space, the cam-receiving space being so positioned that when the bail is moved against the bail stop a second notch in the bail is located in the opening of the cam in said cam-receiving space, said tab and cam feeding means being arranged to feed the tabs and cams along parallel paths but in opposite directions to the tab-receiving and cam receiving spaces.

15. Apparatus according to claim 1, in which the die also has a cam-receiving space and forms a stop for a cam in said last space, and means for feeding perforated cams one-by-one into said space and against said last stop, whereby the cam opening is aligned with the bail stop and with the opening in the tab in said tab-receiving space, the cam-receiving space being so positioned that when the bail is moved against the bail stop a second notch in the bail is located in the opening of the cam in said cam-receiving space, the die including a yielding support for the tab and cam in said spaces, said support normally holding the tab and cam with adjacent ends thereof located between the bail and mandrel in the stopped position of the bail, the support being yieldable relative to said stopped position of the bail and in the advancing direction of the plunger, whereby the plunger is operable through the mandrel and said body to displace the tab and cam into the respective notches in the bail incident to pressing the body against the bail.

References Cited in the file of this patent

UNITED STATES PATENTS

| | | |
|---|---|---|
| 545,756 | Adt | Sept. 3, 1895 |
| 1,298,741 | Leckinger | Apr. 1, 1919 |
| 2,320,566 | Carlile | June 1, 1943 |
| 2,384,145 | Voity | Sept. 4, 1945 |